(12) United States Patent
Trojosky et al.

(10) Patent No.: US 11,724,264 B2
(45) Date of Patent: Aug. 15, 2023

(54) SYSTEM AND METHOD FOR THE GRAVIMETRIC SORTING OF A MIXTURE OF SUBSTANCES

(71) Applicant: Allgaier Werke GmbH, Uhingen (DE)

(72) Inventors: Mathias Trojosky, Kirchheim unter Teck (DE); Thomas Oberer, Koengen (DE); Manuel Sebastian de la Sierra, Madrid (ES)

(73) Assignee: Allgaier Werke GmbH, Uhingen (DE)

( * ) Notice: Subject to any disclaimer, the term of this patent is extended or adjusted under 35 U.S.C. 154(b) by 0 days.

(21) Appl. No.: 17/398,519

(22) Filed: Aug. 10, 2021

(65) Prior Publication Data
US 2022/0048041 A1    Feb. 17, 2022

(30) Foreign Application Priority Data
Aug. 11, 2020    (DE) .......................... 102020004891.9

(51) Int. Cl.
*B03B 9/06*    (2006.01)
*B03B 1/00*    (2006.01)
*B03B 4/00*    (2006.01)

(52) U.S. Cl.
CPC ................ *B03B 9/065* (2013.01); *B03B 1/00* (2013.01); *B03B 4/00* (2013.01)

(58) Field of Classification Search
CPC .... B03B 1/00; B03B 4/00; B03B 4/02; B03B 4/06; B03B 9/065; B07B 4/08; B07B 9/02
See application file for complete search history.

(56) References Cited

U.S. PATENT DOCUMENTS 1,839,117 A      12/1931   Adriaan
3,917,567 A  *   11/1975   Barrett ...................... B07B 7/02
                                                           209/36

(Continued)

FOREIGN PATENT DOCUMENTS

AT          345 566          9/1978
AT          398534           7/2008

(Continued)

OTHER PUBLICATIONS

Wen-Ling Huang et al from Resources, Conservation and Recycling 37 (2002), 23-37.

*Primary Examiner* — Michael McCullough
*Assistant Examiner* — Kalyanavenkateshware Kumar
(74) *Attorney, Agent, or Firm* — Sheehan Phinney Bass & Green PA

(57) ABSTRACT

The invention relates to a system for the gravimetric sorting of a mixture of substances during the processing and/or the recycling of residual building materials and/or demolition materials, comprising a fractioning unit (2) adapted to divide the mixture of substances into at least m fractions (A, B, C); at least n·m gravimetric densimetric tables (A.1, A.2.2, A.3.2), arranged in m cascades each with at least n densimetric tables distributed to n stages, wherein the fractioning unit is coupled to them densimetric tables (A.1) of the first stage such that a different one of the at least m fractions can be supplied to each of the densimetric tables of the first stage; wherein, within each cascade, each densimetric table of a considered stage (A.2.2, A.3.2) is coupled to a densimetric table (A.1, A.2.2) of the preceding stage such that either the first partial fraction or the second partial fraction (12, 22) of the densimetric table (A.1, A.2.2) of the preceding stage can be supplied to the densimetric table (A.2.2, (Continued)

Figure 1:
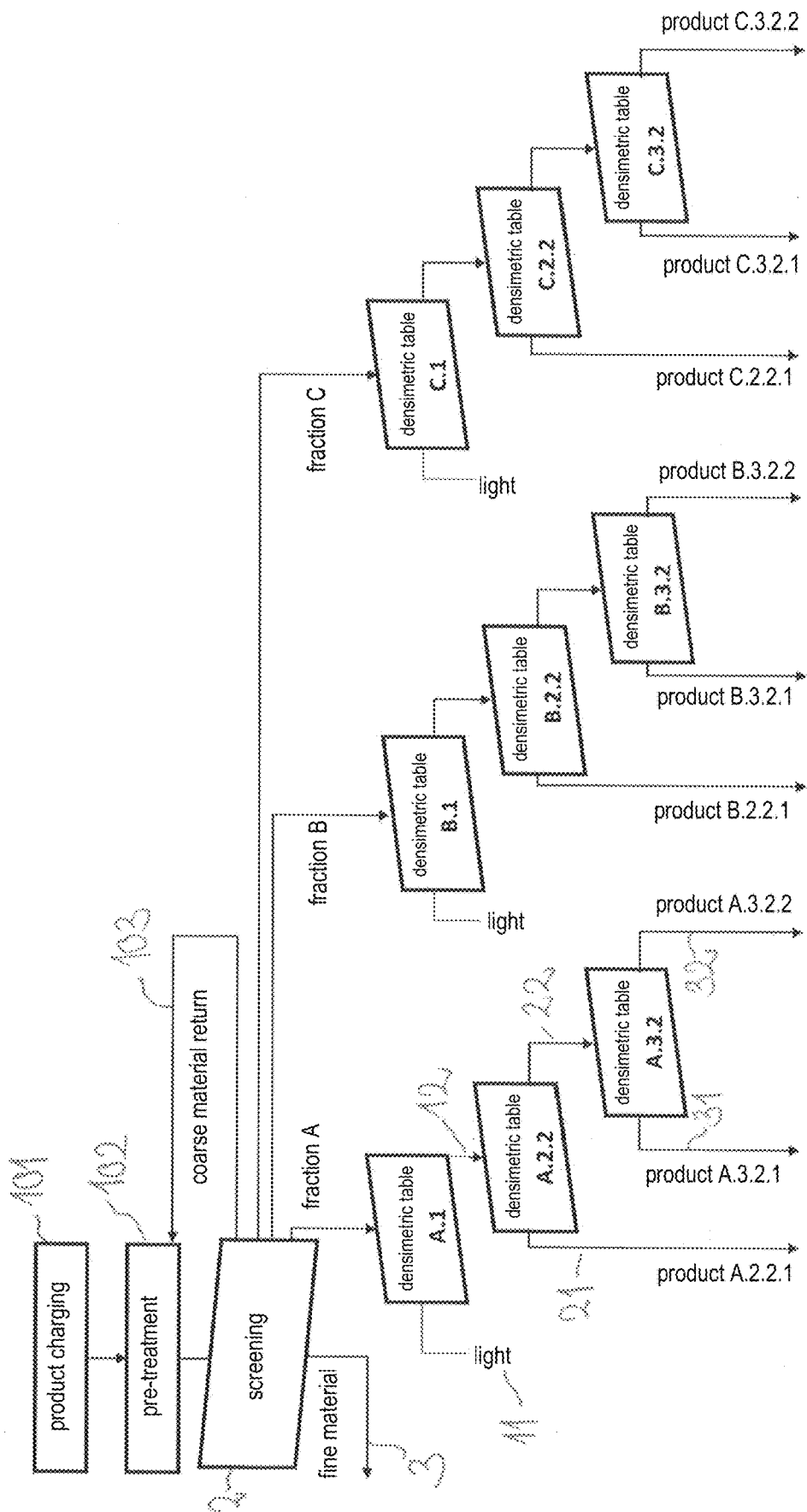

A.3.2) of the considered stage. An appropriate method is also part of the invention.

17 Claims, 5 Drawing Sheets

(56) References Cited

U.S. PATENT DOCUMENTS

| | | | |
|---|---|---|---|
| 4,671,867 A * | 6/1987 | Battie | B22C 5/18 |
| | | | 209/40 |
| 5,240,114 A | 8/1993 | Parker et al. | |
| 5,314,266 A | 5/1994 | Smith et al. | |
| 5,992,774 A | 11/1999 | Oh | |
| 6,382,425 B1 | 5/2002 | Brickner et al. | |
| 2011/0126856 A1* | 6/2011 | Kegler | B29B 17/02 |
| | | | 134/11 |
| 2012/0037733 A1* | 2/2012 | Gitschel | B02C 23/18 |
| | | | 241/24.1 |
| 2013/0012640 A1 | 1/2013 | Kim et al. | |
| 2016/0067745 A1* | 3/2016 | Andersen | B07B 9/02 |
| | | | 209/21 |
| 2016/0369371 A1* | 12/2016 | Conway | B03B 9/04 |
| 2020/0261952 A1* | 8/2020 | Murata | B09B 5/00 |

FOREIGN PATENT DOCUMENTS

| | | | |
|---|---|---|---|
| DE | 28 42 259 | 3/1984 | |
| DE | 3644603 | 10/1987 | |
| DE | 3708180 | 9/1988 | |
| DE | 3803809 | 1/1991 | |
| DE | 4036427 | 5/1992 | |
| DE | 4413288 | 5/1996 | |
| DE | 10 2004 050026 | 4/2006 | |
| DE | 10 2006 006372 | 5/2007 | |
| DE | 10 2015 108563 | 3/2016 | |
| EP | 0198945 | 10/1986 | |
| EP | 294801 A * | 12/1988 | B03B 4/02 |
| EP | 0456666 | 1/1994 | |
| EP | 0755726 | 12/1994 | |
| EP | 0548491 | 8/1996 | |
| WO | 2004016355 | 2/2004 | |

* cited by examiner

SYSTEM AND METHOD FOR THE GRAVIMETRIC SORTING OF A MIXTURE OF SUBSTANCES

This application claims priority to German Patent Application No. 102020004891.9, filed Aug. 11, 2020. The contents of the prior application is incorporated by reference herein in its entirety.

The invention relates to a system and a method for the gravimetric sorting of a mixture of substances. In particular, the invention relates to a system and a method for the recycling of building material, especially residual building materials and demolition materials, by means of gravimetric sorting.

All over the world, raw materials for the building materials industry belong to those goods that have to be provided with the highest amounts and production rates. In particular, sands and gravels are required (also grit and crushed stones), but also clays, lime stone, plaster as well as various additives such as, for instance, pumice, perlite, zeolite and others. These mineral basic materials which are usually obtained from natural raw material sources are, during the production of concrete and of building materials and building elements, processed to form combined materials—for instance, by adding fibers, paper granulate, polystyrene, glass wool, wood, bitumen, flue ash, slag, etc.

The demand of high-quality raw materials has been increasing rapidly due to ever more frequent and ever larger building projects while the offer has become scarce and expensive due to an increasingly difficult availability as a consequence of expiring resources.

At the same time, the occurrence of demolition materials has been increasing and has met difficult conditions for the depositing of rubble and residues. Recycling of residues from building industry is therefore urgently necessary.

The described variety of mixtures of substances from the most various residues aggravates efficient recycling, on the one hand, while, on the other hand, the demands of the consumers in the building industry with respect to the quality of the basic materials used are very high and are legally regulated by provisions and standards. These circumstances have resulted in a very conservative behavior with the use of raw materials and to a very restricted openness of the market for alternative or recycled raw materials and building materials.

Since, in the past, the required raw materials could be obtained rather cheaply, complex methods for the homogeneous separation of the mixtures of substances could not prevail so far since the price of the products obtained with high effort was not competitive in the market.

For recycling, especially mineral components such as concrete, stones, gravels, sands as well as also fragments of roof tiles or brickwork (clay materials) are interesting. The demolition materials therefore must be freed from substances such as wood, plastics, fibers, paper, and cardboard, but, if possible, also from glass, metal, plaster, bitumen, etc. Apart from the mineral substances obtained, the separated extraneous materials mentioned may be processed otherwise or re-used or else be thermally utilized.

Usually, simple methods are employed in industrial practice to separate, at least by means of screening, for instance, those extraneous materials which differ with respect to grain size or grain shape from stones and gravel, for example.

By using crushers and mills one can take advantage of the fact that the different substances partially break up in characteristic particle sizes and may then be obtained by screening, albeit with rather minor quality. DE 3803809 A1 describes a mobile facility consisting of a combination of a crusher unit and a screening station. The mobility of the facility complies with the circumstance that the demolition substances normally accrue at changing locations or building sites. Due to its restricted size and complexity the facility is not capable of sorting substances by their density, especially not of precisely separating a number of different substances. Further mobile facilities are described in WO 2004016355 A1 and in U.S. Pat. No. 6,382,425 B1.

Since the processing of residual building materials and demolition materials by means of crushing and screening produces only limited qualities, the recycling products obtained are substantially used as filling materials in underground work, but not for the production of new supporting structures. DE 4036427 A1 describes mixture of building materials produced by crushing and screening which is, due to the addition of hydraulic binders and flue ash, suited for producing base layers in underground work and in road building.

DE 10 2006 006372 A1 describes a method for the recycling of masonry rubble of solid bricks crushed by means of an impact crusher. A method described by EP 0548491 B1 also works exclusively with crushers and screening machines so as to crush homogeneous concrete rubble by means of at least one grinding crusher and to break it up into recyclable fractions by means of screening. A separation of extraneous materials or impurities does not take place.

EP 0456666 B1 describes a method in which, from rubble or else from industrial waste, components such as wood, metal, textile, paper, plastics or the like, which are defined in this case as recyclable materials, are to be regained. The method consists of a combination of screening machines, metal separators, and manual selection. The assembly of the machines moreover is to take place in a mobile manner in transportable containers. A high-quality sorting of the mineral components for recycling, for instance, for the production of concrete, is not particularly emphasized in this case.

Since the mixtures of substances also contain extraneous materials which do not differ from the good products by the grain size or by the grain shape, one has attempted sporadically, e.g. by means of airstream sorting, i.e. by means of blowing out, to remove materials such as paper or light fibers which have a substantially lower density that deviates very strongly from the good products, or which can be separated by blowing due to their shape (scraps of paper).

By means of air separators and so-called zigzag separators one has tried to achieve a fractionation of the mixtures of substances by density. Air separators blow out only very light materials from a mixture of substances to the top. Mixtures of different density whose components are, however, both relatively heavy, cannot be treated reasonably by air separators since even the lighter particles are still too heavy to blow them out to the top.

AT 398534 B describes such method, wherein the mixtures of substances are pre-sorted, crushed by means of jaw crushers or impact crushers, subsequently screened in fractions of narrow grain bandwidth by means of screening machines, and then the individual fractions are supplied to one or a plurality of air separators.

A facility of a plurality of such and/or similar tube-shaped separators is described in EP0755726 B1, wherein the waste air flow is separated after passing a filtering unit and after segregating the separated light fraction, and a partial flow of the air is supplied to a nozzle in the region of the charging of the mixture, which is to yield good efficiency.

EP0198945 A2 describes a very similar facility of a plurality of separators for separating undesired good particles from rubble. The facility enables, by means of a plurality of parallel separator tubes, the treatment of fractions previously classified into the corresponding number, wherein especially wood, plastics, roofing cardboard, and similar materials are separated, but no further sorting of the heavy fractions is possible.

A method and a device for the dry sorting of multi-component products by using a plurality of air separators is also described in DE 28 42 259 A1.

The air separators and zigzag separators described, however, have the disadvantage that they have to be operated at high air speeds and thus with high specific amounts of air and have, due to the construction, a geometry which is rather obstructive for the air and solid matter flows, so that high wear and tear of the machines results. Moreover, zigzag separators have a large construction height and thus cause a high air resistance and hence a high energy requirement for conveying the air through the facilities.

The Article by Wen-Ling Huang et al from Resources, Conservation and Recycling 37 (2002), 23-37, also describes a method making use of air separators. By means of the air separators it is only possible to separate particularly light components such as paper and plastics. The heavy fraction subsequently has to be sorted manually so as to remove wood, non-iron metals and other undesired substances.

In supplement to mechanical sorting methods, manual activities for separating associated materials which are difficult to detect or very large are frequently used. An apparatus supporting the manual sorting is described in US 2013 0126401 A1. A facility for enabling manual sorting is also illustrated in DE 3644603 C1.

A specific separator for separating rubble which operates with an air flow guided transversely to the dropping substance stream is described in DE 3708180 A1. A wide solid matter stream is guided through the sword-like air flow of a horizontally arranged air nozzle, which is to improve the demand of energy and/or air of the separator. As in the case of other air separators, the blown-out light fraction is output to the top with the separator air and freed from the solid matter carried along in a separator. A device for selecting rubble which works in a similar manner is described in DE 4413288 C2.

Especially from the recycling of ores so-called jigging machines are known, which are capable of separating particles of approximately equal grain shape and grain size by their density. The methods have the decisive disadvantage that the substances are moistened and/or saturated with water, and that the products gained usually have to be dried with much effort then. Moreover, the methods consume water and produce strongly polluted waste waters which have to be treated and cleaned. The substances to be separated are put in the upwardly directed water stream in cross-flow. Particles of minor density float on the particles of higher density, so that a layering of the substances by their density is produced. By means of an adjustable horizontal sword positioned at one end of the machine the substances are preferably separated at the separation boundary between the layers of different density positioned on top of each other.

A device in accordance with the basic principle of jigging machines is, for instance, known from DE 10 2015 108563 B3.

Since jigging machines are limited with respect to the particle sizes that can be treated, so-called float-sink methods are used which make use of the sinking rate of particles having different heaviness or density, but are also operated with water and also lead to the moistening of the substances, see in this respect, for instance, U.S. Pat. Nos. 5,240,114 A and 1,839,117 A.

By the method described in U.S. Pat. No. 5,992,774, A residual building materials with relatively coarse graining about 25 mm, and/or between 45 mm and 75 mm, are merely washed and sorted coarsely. In this method no recycling products are produced which correspond to the quality of high-grade raw materials if pollutions by wood, plastics, plaster, etc. occur in the initial substances. A similar method is described in U.S. Pat. No. 5,314,266 A.

Sporadic efforts of operating jigging machines in a dry manner with air instead of water have not been able to prevail in industrial practice due to their minor separating qualities.

DE 10 2004 050026 A1 proposes a method using optoelectronic sorting in the near infrared range (NIR) for the dry treatment of the residual building materials. The machines in accordance with this principle are, however, highly complex and thus very expensive, so that the recycling of the building materials is associated with high costs and hence with high prices for the recycling materials produced.

Another method principle for the dry separation of mixtures of substances by density (gravimetric sorting) is used in so-called densimetric tables. Densimetric tables have traditionally been successfully used in the recycling of cable scrap, for instance. Thus, AT 345 566 B, for example, describes a method and devices for regaining the components of scrap in which a plurality of dry separating devices designed as "pitters" are used. The pitters described, however, have the great disadvantage that they are only capable of efficiently separating components with a high density difference of at least 100%.

For separating building materials, conventional densimetric tables are currently not used or only used very sporadically with restricted functionality. The reason for this is, on the one hand, the restrictions concerning size and heaviness of the particles as well as the limitations in separating quality in the case of coarse, heavy particles or in the case of small differences in density, and, moreover, the lacking availability of machines capable of managing the high and very high solid matter throughput required in building materials industry.

A substantial disadvantage of all the afore-mentioned solutions is that the known methods are not suited to separate the various substances contained in the residual building materials and demolition materials in such a homogeneous manner that the products obtained meet the high quality requirements that are required for the production especially of supporting concrete constructions.

It is therefore an object of the present invention to provide a system and a method for the sorting of demolition materials from building industry which remedy the known deficiencies and weaknesses of existing solutions, and which are capable of also separating mixtures of substances of many different materials of different density with high sharpness of separation and high throughput.

The recycling substances obtained are to constitute reusable materials which may especially be used as additives for the production of concrete, and which fulfil the high quality demands and strict provisions and laws concerning raw materials to be used in construction engineering.

The object in accordance with the invention is solved by the system of claim 1, the facility according to claim 9, the use according to claim 10, and the method according to claim 11.

Further advantageous embodiments of the invention are indicated in the dependent claims 2-8 and 12-16.

In accordance with one aspect of the invention there is provided a system for the gravimetric sorting of a mixture of substances. This system comprises: a fractioning unit adapted to divide the mixture of substances into at least m, m≥1, fractions, wherein each fraction comprises particles of a predetermined size distribution; at least n·m gravimetric densimetric tables which are arranged in m cascades each with at least n, n≥1, gravimetric densimetric tables distributed to n stages such that each stage comprises per cascade at least one gravimetric densimetric table. The fractioning unit is coupled to the m gravimetric densimetric tables of the first stage such that a different one of the at least m fractions can be supplied to each of the gravimetric densimetric tables of the first stage. Each gravimetric densimetric table is adapted to separate particles supplied thereto into an assigned first partial fraction of particles having a density which is smaller than a separating density assigned thereto, and into an assigned second partial fraction of particles having a density which is larger than the separating density assigned thereto. Within each cascade, each gravimetric densimetric table of a considered stage is coupled to a gravimetric densimetric table of the preceding stage such that either the first partial fraction or the second partial fraction of the gravimetric densimetric table of the preceding stage can be supplied to the gravimetric densimetric table of the considered stage. When the first, i.e. light, partial fraction is supplied, the assigned separating density of the gravimetric densimetric table of the considered stage is chosen to be smaller than the assigned separating density of the gravimetric densimetric table of the preceding stage. When the second, i.e. heavy, partial fraction is supplied, the assigned separating density of the gravimetric densimetric table of the considered stage is chosen to be larger than the assigned separating density of the gravimetric densimetric table of the preceding stage.

The mixture of substances comprises typically residual building materials and demolition materials.

Preferably, the system is used during the processing and/or the recycling of residual building materials and demolition materials.

Typically, the mixture of substances comprises plastics, wood, plaster, glass, clay, concrete, ceramics, stones, broken stones, and/or metal, typically present in parts or pieces of different size.

Preferably, m>1 or else m≥3. Particularly preferred there applies n·m>1; this means that either more than one cascade or more than one gravimetric densimetric table per cascade is present. Furthermore, preferably n>1. For the case of n=1 only one stage of gravimetric densimetric tables exists. In this case all partial fractions separated in the first stage are transported off for further processing or collected. Supplying to gravimetric densimetric tables of a further stage is omitted. It is also in accordance with the invention if the fractioning unit produces more fractions than cascades of gravimetric densimetric tables are available.

The gravimetric densimetric tables in accordance with the invention are gravimetric densimetric tables which are used for dry gravimetric sorting. This means the densimetric tables in accordance with the invention are dry-working densimetric tables for sorting by density.

Particularly preferred, each of the gravimetric densimetric tables comprises a work floor adapted to be flown through by air and to be vibrated so as to thus separate the first partial fraction from the second partial fraction.

It is of advantage if the gravimetric densimetric tables used comprise a work floor adapted to be flown through with air from the bottom and arranged transversely in the densimetric table. It is further of advantage if the mixture of substances to be separated is supplied on the work floor in the middle or close to the middle. The work floor is therefore expediently perforated. It is especially expedient if the work floor can be vibrated at a particular angle to the normal in the direction of the ascent of the inclined work floor. The particles impacting the work floor after being fed into the machine and sinking, due to their heaviness, i.e. due to their high density, preferably onto the work floor despite the vertical air flow and remain there are conveyed in the direction of the vibration and hence in the direction of the ascent of the work floor. At the higher one end of the work floor these particles may then be discharged. While this product share is substances of higher density, a slight fluidization of the mixture of substances occurs in the center of the product charging as a consequence of the air flow guided through the perforated work floor. Due to this, the light particles, i.e. particles with lower density, are slightly lifted by the perpendicular upward flow of the air. Thus, they have no or only little contact with the work floor. Furthermore, the components of the mixture of substances are expediently layered by density. The lighter particles contained in the mixture of substances float on the heavier particles and slide on the layer of high density to the deeper other end of the work floor; there, they can be discharged.

By means of the gravimetric densimetric tables the fractions supplied thereto are therefore sorted by density of the components and/or particles of the fractions. By adjusting the strength of the air flow, the angle of inclination of the work floor, the vibration frequency and/or the vibration amplitude it is possible to predetermine a particular density which differentiates one partial fraction from another partial fraction. This particular density is called separating density. In other words, the gravimetric densimetric table outputs particles with a density below the separating density assigned thereto as a first partial fraction, particles with a density above the assigned separating density as a second partial fraction. The parameters mentioned—adjustment of the strength of the air flow, the angle of inclination of the work floor, the vibration frequency and/or the vibration amplitude—are dependent both on the size distribution and on the density of the mixture of substances. This means that the parameters mentioned must be adapted to the size distribution of the (partial) fraction for assigning a particular separating density. Due to the adjustable parameters mentioned the gravimetric densimetric tables usable in accordance with the invention are very flexible since they can easily be set and adjusted to changed requirements of the initial substances to be treated.

It goes without saying that each of the gravimetric densimetric tables used in the system according to the invention may have a different separating density assigned to it. The choice of an advantageous separating density as a function of a partial fraction supplied to a particular gravimetric densimetric table will be described further below.

Due to the fact that the fractioning unit in accordance with the invention is adapted to divide the mixture of substances into at least m fractions each with particles of a predetermined size distribution, the advantage is achieved that each gravimetric densimetric table of the first stage is supplied with particles being in a particular predetermined size range. Preferably, the fractioning takes place by the grain size of the particles. The grain size of the particles may, for instance, be predetermined and determined by the mesh width of the screens used in the fractioning unit.

Specifically, it is possible that the first fraction comprises particles with a grain size in a first range ($x_{11}$, $x_{12}$), the second fraction particles with a grain size in a second range ($x_{21}$, $x_{22}$), etc., and the m-th fraction particles with a grain size in an m-th range ($x_{m1}$, $x_{m2}$). Expediently, no range overlaps with another one; particularly preferred, the ranges follow one another almost seamlessly, i.e., $x_{12}=x_{21}$; $x_{22}=x_{31}$; etc. $x_{(m-1)2}=x_{m1}$.

Preferably, the grain size distribution of the fractions is chosen such that the next higher particle size is always the double of the preceding particle size, i.e., $x_{m2}=2 \cdot x_{m1}$.

Preferable grain size distributions are ($x_{11}$, $x_{12}$)=(0 mm, 3 mm), ($x_{21}$, $x_{22}$)=(3 mm, 9 mm), ($x_{31}$, $x_{32}$)=(9 mm, 25 mm) or else ($x_{11}$, $x_{12}$)=(0 mm, 2 mm), ($x_{21}$, $x_{22}$)=(2 mm, 4 mm), ($x_{31}$, $x_{32}$)=(4 mm, 8 mm), ($x_{41}$, $x_{42}$)=(8 mm, 16 mm), ($x_{51}$, $x_{52}$)=(16 mm, 32 mm) et al.

The specific purpose of the division of the mixture of substances in fractions by the size distribution of the particles and the supplying of the fractions to different gravimetric densimetric tables is a more precise separation of the particles by their density. Particularly preferred, the size distribution is the grain size distribution. The reason for this is that small, heavy particles may have a similar fluidization or sinking behavior in air as larger, light particles. This means that, without the fractioning of the mixture of substances by means of the size, especially grain size, of the particles the quality of the sorting by density by means of gravimetric densimetric tables may be bad. In other words, advantageously the (grain) size distributions of the individual fractions of the mixture of substances are chosen such that the particles are not sorted by the weight of the individual particles, but actually by the density of the substances forming the particles. This is the case with narrow fractions m, for the grain size ranges of which there applies e.g. ($x_{m1}$, $x_{m2}=2 \cdot x_{m1}$). Depending on the density difference of the components to be separated the ranges may also be chosen narrower or wider.

Another advantage of the invention thus consists in that, due to the fractioning of the mixture of substances, the sorting by density of the individual particles may be performed very precisely by each gravimetric densimetric table. Basically, the separating density may be chosen arbitrarily, so that also materials with a small density difference can be separated from each other. Thus, the gravimetric densimetric tables may preferably be designed such that particles of substances can be separated from each other whose densities have a difference of 50%, preferably of only 20%, particularly preferred of only 10%. Nevertheless, the person skilled in the art knows that sorting with a hundred percent exactness can as a rule not be implemented technically. This means that each fraction or partial fraction—including light and heavy fractions—comprises a—technically conditioned—smaller share of particles whose (grain) size and/or density lies outside the predetermined frame. If it is claimed here that each fraction comprises particles of a predetermined size distribution, or that particles of a partial fraction and/or light or heavy fraction have a density larger or smaller than a predetermined separating density, this mode of speaking does not exclude that a small share (typically under 15%, preferably under 10%, particularly preferred under 5%) of the particles of the (partial, light, heavy) fraction does not fulfil the demanded requirements from the practice. For the numerical examples indicated one also says that the gravimetric densimetric tables have a separating efficiency of 85%, 90%, and/or 95%. It is expedient if the gravimetric densimetric tables have a separating efficiency in the range of 80% to 95%.

Due to the fact that a fraction undergoes sorting through at least n gravimetric densimetric tables of a cascade it is guaranteed that the individual components and/or particles can be separated precisely by their densities. Every further stage of the cascade enables a further, finer limitation of a density range. The narrower the density range, the less substances and/or materials (components) will the associated partial fraction contain. In other words, the system in accordance with the invention enables a separation of particles even if the density differences of the (partial) fractions to be separated are only very small.

In the following, a component is not only a pure substance and/or a pure material, a component may also comprise a mixed material, a mixed substance, or a mixture of substances.

The combination of fractioning and of a separation by means of parallel gravimetric densimetric tables arranged in cascades thus enables an (almost) homogeneous separation of the mixture of substances.

The system has the further advantage that, due to the use of the gravimetric densimetric tables, the use of water can be omitted during the processing. The components are not moistened unnecessarily.

The partial fraction that is not supplied to a gravimetric densimetric table of the next stage within a cascade may be further processed in various manners in accordance with the invention. Thus, it is, for instance, possible that this partial fraction is transported off by means of conveyor bands, for example, and is collected in appropriate containers.

Preferably, each stage comprises per cascade exactly one gravimetric densimetric table which a partial fraction of the preceding stage can be supplied to.

In this case the system comprises n·m gravimetric densimetric tables which are arranged in n stages with m gravimetric densimetric tables each, and wherein n gravimetric densimetric tables each from different stages form a cascade. One may imagine this arrangement—expressed abstractly—as a matrix in which the gravimetric densimetric tables are arranged in n rows, i.e. in parallel, and in m columns. The real geometric arrangement of the gravimetric densimetric tables is, of course, not restricted to a matrix structure. The latter only serves the easier description of the stages and cascades in accordance with the invention. This is because when making the picture of the matrix a basis, then the stages of the system according to the invention may be illustrated as rows of the matrix and a cascade of gravimetric densimetric tables as a column of the matrix.

The number P of the final products, for instance, the components obtained, e.g. pure materials, which are obtained per fraction and/or cascade for the case that one cascade comprises n stages and, from one stage to the next one, only always one partial fraction is transported further to a corresponding gravimetric densimetric table, results as follows: For every stage k with $1 \leq k \leq n-1$ the respective gravimetric densimetric table may separate a partial fraction with a final product, whereas the other partial fraction is supplied to a corresponding gravimetric densimetric table of the subsequent stage. The gravimetric densimetric table of the last stage k=n produces two partial fractions; hence it can separate two final products. Thus, $P=(n-1)\cdot 2=n+1$. Or, in other words, in order to obtain P final products, at least P−1 stages, thus at least P−1 gravimetric densimetric tables per cascade are required in the arrangement described. Furthermore, it may be assumed that the processing time T of the partial fractions increases linearly with the number of stages, i.e. in order to separate P final products from the mixture of substances, T is approximately proportional to P−1. The choice of suitable separating densities for implementing this arrangement will be described further below.

It is also in accordance with the invention if, within a cascade, for each stage the first partial fraction of a particular stage is supplied to the gravimetric densimetric table of the subsequent stage. This means that of the two partial fractions produced by the gravimetric densimetric table of the particular stage of the cascade, always only the one partial fraction within the cascade is supplied to the gravimetric densimetric table of the subsequent stage of the cascade which comprises particles with a density that is smaller than the separating density assigned to the gravimetric densimetric table of the particular stage. This partial fraction is also referred to as light fraction.

In this case it is expedient to choose the respective separating density such that it lies between the densities of the heaviest and the second-heaviest component in the fraction to be separated of the considered stage. In other words, the separating density assigned to the gravimetric densimetric table of a considered stage is chosen such that only the heaviest component of the fraction supplied to it is separated. Then, a separation by the individual components may be effected.

It is then expedient to transport off the respective other, second partial fraction from each separating stage, for instance, for collecting in a container or the like.

It is also in accordance with the invention if, within a cascade, for each stage only the second partial fraction of the one stage is supplied to the gravimetric densimetric table of the subsequent stage. This means that of the two partial fractions produced by the gravimetric densimetric table of the particular stage of the cascade, within the cascade always the one partial fraction is supplied to the gravimetric densimetric table of the subsequent stage of the cascade which comprises particles with a density that is larger than the separating density assigned to the gravimetric densimetric table of the particular stage. This partial fraction is also referred to as heavy fraction.

In this case it is expedient to choose the respective separating density such that it lies between the densities of the lightest and second-lightest component in the fraction to be separated of the considered stage. In other words, the separating density assigned to the gravimetric densimetric table of a considered stage is chosen such that only the lightest component of the fraction supplied to it is separated.

It is then expedient to transport off the respective first, i.e. light partial fraction, for instance, for collecting in a container or the like.

In accordance with the invention it is also possible that only a part of the partial fractions produced in a stage is supplied to respective assigned gravimetric densimetric tables of the subsequent stage. In this case there exist stages in which partial fractions are either collected in containers, for instance, or are further processed otherwise. A partial fraction produced at a particular stage then need not be supplied to a further gravimetric densimetric table, for instance, if this partial fraction already comprises particles of a particular density range which enables to determine that the particles are to be assigned to one single material (component). For the partial fraction and/or partial fractions which is/are supplied to a gravimetric densimetric table of the next stage within a cascade it is possible to also further separate the particles of said partial fraction by their density.

If, within a cascade, more than one gravimetric densimetric table is additionally used per stage so as to separate assigned partial fractions by density, the cascade structure becomes a tree structure of gravimetric densimetric tables. Thus, it may be the case that per fraction in stage k maximally $2^{k-1}$ ($1 \le k \le n$) gravimetric densimetric tables are present. The gravimetric densimetric tables coupled with one another within the tree structure over several stages form—figuratively speaking—branchings/branches of the tree. In accordance with the invention it is not necessary that each branch reaches up to the n-th stage, i.e. it may also be that particular branchings/branches already end at stage k<n since the corresponding gravimetric densimetric table is then no longer coupled to any further gravimetric densimetric table of the subsequent stage.

Advantageously, the system comprises at least one cascade comprising at least one stage k, 1<k<n, with at least one additional, second, gravimetric densimetric table, wherein the second gravimetric densimetric table can be supplied with a partial fraction of the preceding stage k−1 and, if stage k comprises more than one additional gravimetric densimetric table, each of these further gravimetric densimetric tables can be supplied with a corresponding partial fraction of the preceding stage k−1.

Preferably, at least one cascade exists within the system which comprises at least one stage with two gravimetric densimetric tables. This stage be the stage k, 1<k<n. Each of these two gravimetric densimetric tables can be supplied with a partial fraction of the preceding stage k−1. Each of these two gravimetric densimetric tables separates the respective partial fraction supplied to it into a corresponding further light partial fraction and heavy partial fraction. Each gravimetric densimetric table has a particular separating density assigned to it. The separating densities are expediently chosen differently. Thus, four partial fractions are formed. In accordance with an expedient embodiment, however, at most two partial fractions of these four partial fractions are transported to the subsequent stage k+1. If the subsequent stage again comprises two gravimetric densimetric tables, each of these gravimetric densimetric tables is supplied with a respective partial fraction produced in stage k. If the stage k+1 comprises only one gravimetric densimetric table in the cascade, only one partial fraction is supplied to this stage. If two gravimetric densimetric tables are present in the cascade in stage k+1, either the two partial fractions produced in stage k by a gravimetric densimetric table may be supplied to the gravimetric densimetric tables of the stage k+1, or a partial fraction of the one gravimetric densimetric table of stage k and a partial fraction of the other gravimetric densimetric table of stage k may be supplied to the gravimetric densimetric tables of the stage k+1. The partial fractions which are not supplied to further gravimetric densimetric tables may be processed otherwise and/or be collected in containers.

It is expedient if at most two gravimetric densimetric tables are used per fraction per stage.

It is particularly advantageous if at least one cascade in stage k comprises a number of $2^{k-1}$ gravimetric densimetric tables, namely for every k=1 to k=n. This means, from one stage to the next one always all partial fractions produced in a particular stage are supplied to corresponding assigned gravimetric densimetric tables of the subsequent stage. In one stage k thus $2^{k-1}$ gravimetric densimetric tables, each with assigned separating densities, are used in parallel. If a cascade comprises n stages, this cascade comprises a total of $$N = \sum_{k=1}^{n} 2^{k-1} = 2^n - 1$$

gravimetric densimetric tables. Since, from each gravimetric densimetric table of each stage k from 1 to n−1 both partial fractions are supplied to assigned gravimetric densimetric tables of the subsequent stage, in the described arrangement final products are only produced by the gravimetric densimetric tables of the last stage k=n. Since the stage k=n comprises a total of $2^{n-1}$ gravimetric densimetric tables, and since each gravimetric densimetric table produces two partial fractions, a total of $P=2^n$ final products can be produced on stage n.

If P final products are to be separated from the mixture of substances in one cascade, $$n=\lceil \log_2 P \rceil$$

stages are required. The parenthesis in the foregoing expression indicates that the result is rounded to the next integer number. If P final products are to be produced with this arrangement, $$N=2^n-1=2^{\lceil \log_2 P \rceil}-1$$

gravimetric densimetric tables are required. One recognizes that, if P is a power of 2, $P=2^n$, then $N=P-1$ gravimetric densimetric tables are required. This is exactly as much as in the arrangement described above in which only always one partial fraction is transported further from one stage to the next one. Since, in the arrangement considered here, a plurality of gravimetric densimetric tables in parallel separate particles in the cascade per stage, however, only $n=\lceil \log_2 P \rceil$ stages are necessary, and the time required for the separation of the P final products is T approximately proportional to $\lceil \log_2 P \rceil$. This means that the total separation time increases in the considered arrangement only logarithmically with the number of final products, whereas in the above-described arrangement, in which always only one partial fraction is transported further from one stage to the next one, the total separation time increases linearly with the number of final products. With the arrangement described here it is thus possible to effect considerable time saving.

If $P=2^n$ predetermined final products are to be available in stage n, wherein the fraction supplied to a cascade is provided as a mixture of substances with corresponding $P2^n$ components/substances, the separating densities for the $2^{k-1}$ gravimetric densimetric tables of stage k are expediently determined as follows: For the stage k=1 the separating density is chosen such that it lies between the densities of the lightest P/2 components and the heaviest P/2 components (wherein "light" and "heavy" is always related to the density and not to the mass of the particles). For the stage k=2 the separating density of the first gravimetric densimetric table is chosen such that it lies between the densities of the lightest P/4 components and the next heavier P/4 components; the separating density of the second gravimetric densimetric table is chosen such that it lies between the densities of the next, next heavier P/4 components and the heaviest P/4 components. For the stage k=3 and the following stages the separating densities result from the continuation of the scheme described. In other words: If a particular gravimetric densimetric table is supplied with a (partial) fraction with q components to be separated, a separating density is in the considered configuration expediently assigned to it which is determined such that one partial fraction produced by the gravimetric densimetric table comprises the q/2 lighter components and the other partial fraction produced comprises the q/2 heavier components.

The more gravimetric densimetric tables are used per cascade and per stage in parallel for separating partial fractions, the shorter is the total separating time for separating a mixture of substances into a predetermined number of final products. If fractioning of the initial mixture of substances into particularly narrow grain classes is performed for this purpose, the sorting exactness of every single densimetric table will additionally increase.

In the afore-described example it was assumed that the number P of the components to be separated constitutes a power of 2. If P is no power of 2, it is expedient not to provide the maximally possible number, $2^{n-1}$, of gravimetric densimetric tables in the last stage n, but a smaller number K which is still sufficient for separating the P components.

In order to determine this number K of gravimetric densimetric tables in the last stage n, the following generally applicable observation (i.e. these facts are not restricted to a specific arrangement of the gravimetric densimetric tables) shall first of all be pointed out: Each gravimetric densimetric table additionally added to the system increases the number of components that can be separated from the initial fraction by 1.

Making reference to the context described, K must then be chosen such in stage n that the number of partial fractions obtained in stage n−1 (that are $2^{n-1}$) is increased to P. Therefore $$2^{n-1}+K=P$$

$$\Rightarrow K=P-2^{n-1}.$$

In this case some branches of the tree structure thus already end in the stage n−1, whereas K branches reach to the stage n.

The total number N' of gravimetric densimetric tables used in the considered cascade is $$N' = K + \sum_{k=1}^{n-1} 2^{k-1} = K + 2^{n-1} - 1 = P - 1.$$

This means that also in this case exactly as many gravimetric densimetric tables are required as in the arrangement described in detail above where always only one partial fraction is transported further from one stage to the next one. However, only $n=\lceil \log_2 P \rceil$ stages are required, and the time necessary for the separation of the P final products is T approximately proportional to $\lceil \log_2 P \rceil$. This means that in this considered arrangement the total separating time also increases only logarithmically with the number of final products.

The separating densities assigned in the afore-described configuration to the gravimetric densimetric tables may be determined in correspondence with the configuration described further above, where $P=2^n$ final products are produced; however, with the following proviso: If a particular gravimetric densimetric table is supplied with a (partial) fraction with q components to be separated, wherein q is an odd number, a separating density is expediently assigned to it in the considered configuration which is determined such that one partial fraction produced by the gravimetric densimetric table comprises the (q−1)/2 lighter components and the other partial fraction produced comprises the (q+1)/2 heavier components (or vice versa).

Expediently, the assigned separating densities of a particular stage comprise the same values for all m cascades. If each cascade comprises n gravimetric densimetric tables, i.e. if only one partial fraction is supplied to a gravimetric densimetric table per cascade from one step to the next one, all gravimetric densimetric tables of one stage have been assigned with the same separating densities. If more than one gravimetric densimetric table is present per cascade and per stage, this expedient embodiment has to be understood such that the gravimetric densimetric tables of one stage of a particular cascade may indeed have been assigned with different separating densities, but that the gravimetric densimetric tables of the same stage of the other cascades are then also assigned with the same separating densities as the gravimetric densimetric tables of this stage of the particular cascade.

It is expedient if the final products, i.e. the partial fractions produced by gravimetric densimetric tables after the running of the fractions through the cascade structure and/or the tree structure comprising the cascade structure, are collected or transported further or transported off.

It is of advantage if the system further comprises a conveyor unit with a plurality of conveying aggregates, wherein within each cascade each gravimetric densimetric table of one stage is coupled to a gravimetric densimetric table of the preceding stage with a respective conveying aggregate such that a first partial fraction or a second partial fraction of the preceding stage can be supplied to the gravimetric densimetric table of the considered stage via the conveying aggregate. Expediently, the conveying aggregates comprise associated conveyor belts.

Due to the use of the conveyor unit with conveying aggregates it is possible to omit the use of manual picking stations and to provide a largely automated system.

Preferably, the system further comprises a breaking unit adapted for crushing the particles of the mixture of substances, wherein the breaking unit is coupled to the fractioning unit such that the crushed mixture of substances can be supplied to the fractioning unit. Preferably, the breaking unit comprises one or a plurality of jaw crushers and/or one or a plurality of impact crushers. It is expedient if the breaking unit is further coupled to the fractioning unit such that particles of the mixture of substances which exceed a particular predetermined size can be returned from the fractioning unit to the breaking unit again. Due to the returning of the particles exceeding a particular size it is ensured that only particles which correspond to a predetermined (preferably narrow) size distribution of the m fractions get on to the subsequent further processing and sorting.

Expediently, the system further comprises a separator for separating metal parts from the mixture of substances, wherein the separator is coupled to the breaking unit such that the mixture of substances freed from the metal parts can be supplied from the separator to the breaking unit. It is of advantage if ferromagnetic metal parts can be separated from the mixture of substances by the separator. For this purpose, the separator may, for instance, be designed as a magnetic separator or as a suspension magnetic separator. In accordance with the invention it is, however, also possible that, possibly additionally, a separator for non-magnetic metals is used.

The crushing of the particles and the separation of the substances from each other which is usually entrained therewith facilitate the sorting of the materials contained in the mixture of substances in the further course of the process since the previously existing mixing density of the particles from two or more substances is changed toward the density of the respective pure substances.

It is of advantage if the fractioning unit comprises one or a plurality of screening machines. Due to the screening it is possible to produce fractions with a size distribution, especially grain size distribution, which is optimally narrow for the following sorting by means of gravimetric densimetric tables. Preferably, the screening machines are sizers with screen cloths arranged obliquely to the horizontal. They have the advantage that they are largely insensitive to pollutions and congestion and are preferably capable of screening coarse materials with high solid matter throughput.

Moreover, it is possible in accordance with the invention to provide a number of other processing stages, such as e.g. sizers, breaking units, breakers, magnetic separators up to optoelectronic sorters (operated in the near infrared (NIR) and others), upstream and downstream of the gravimetric densimetric tables and possibly between the individual stages by means of the gravimetric densimetric tables.

In accordance with a second aspect of the invention a facility for the processing and/or for the recycling of residual building materials and/or demolition materials is provided which comprises the system according to the first aspect of the invention, wherein the residual building materials and/or the demolition materials are present as a mixture of substances.

A third aspect of the invention relates to the use of the system in accordance with the first aspect of the invention or the facility according to the second aspect of the invention for the processing and/or for the recycling of residual building materials and/or demolition materials, wherein the residual building materials and/or the demolition materials are present as a mixture of substances.

From the state of the art it is not known inter alia to use gravimetric densimetric tables, especially dry gravimetric densimetric tables, for the processing and/or the recycling of residual building materials and/or demolition materials since these densimetric tables, according to the understanding of the state of the art, are not capable of separating the mixtures of highly different building materials in a sufficiently selective manner. This problem is solved by the system in accordance with the invention, as demonstrated in detail before.

In accordance with a fourth aspect of the invention a method for the gravimetric sorting of a mixture of substances is provided, comprising the steps of:
dividing the mixture of substances into at least m, m≥1, fractions, wherein each fraction comprises particles of a predetermined size distribution;
for each fraction of a selection m of the at least m fractions:
separating the particles of the fraction by means of a gravimetric densimetric table of a first stage into a first partial fraction of the first stage with particles having a density below a separating density assigned to the gravimetric densimetric table, and into a second partial fraction of the first stage with particles having a density above the assigned separating density;
for k=1 to k=n−1, n≥1, repeating the following steps to generate partial fractions of the stage n:
(i) transporting a part of or all of the partial fractions generated in stage k to gravimetric densimetric tables of the stage k+1, wherein a transported partial fraction is assigned to each gravimetric densimetric table of the stage k+1 and a separating density is assigned to each gravimetric densimetric table, (ii) separating each of the partial fractions transported to the gravimetric densimetric tables of the stage k+1 by means of the gravimetric densimetric table assigned thereto into two further partial fractions, wherein the first partial fraction comprises particles with a density below the separating density assigned to the gravimetric densimetric table, and the second partial fraction comprises particles with a density above the assigned separating density.

The mixture of substances is typically residual building materials and/or demolition materials.

Particularly preferred, the method is used for the processing and/or the recycling of residual building materials and/or demolition materials, wherein the residual building materials and/or the demolition materials are present as a mixture of substances.

The gravimetric densimetric tables in accordance with the invention are gravimetric densimetric tables used for dry gravimetric sorting.

As to the description of the mode of functioning and of expedient embodiments of the gravimetric densimetric tables used in the method, reference is made to the statements concerning the first aspect of the invention.

Preferably, m>1 or else m≥3. Particularly preferred there applies n·m>1; this means that either more than one cascade or more than one gravimetric densimetric table per cascade exists. Preferably, n>1. For the case of n=1 the method ends after the first stage. The repetition of the steps indicated is then omitted.

The method according to the fourth aspect of the invention comprises the steps already described above in connection with the system of the first aspect of the invention. Insofar, the statements made there apply correspondingly to the extent they are applicable here.

Specifically, however, it is to be mentioned that, by the dividing of the mixture of substances into at least m, m>1, fractions, wherein each fraction comprises particles of a predetermined size distribution, the advantage is achieved that each respective gravimetric densimetric table of the first stage is supplied with particles ranging in a particular predetermined, preferably narrow and/or practically meaningful size range. Preferably, the fractioning takes place by the grain size of the particles. The specific purpose of the dividing of the mixture of substances into fractions by the size distribution of the particles in accordance with the first step of the method according to the invention and the supplying of the fractions to different gravimetric densimetric tables pursuant to steps (i) and (ii) is a more precise separation of the particles by their density. As already explained with respect to the first aspect of the invention, the reason for this is that small, heavy particles may have a similar fluidization or sinking behavior in air as larger, light particles. This means that without the fractioning of the mixture of substances by means of the size of the particles in accordance with the first method step the quality of sorting by density by means of gravimetric densimetric tables may be bad. In other words, the (grain) size distributions of the individual fractions of the mixture of substances are advantageously chosen such that the particles are not sorted by the weight of the individual particles, but actually by the density of the substances forming the particles. Another advantage of the invention thus consists in that, due to the fractioning of the mixture of substances, the sorting by the density of the individual particles by each gravimetric densimetric table may be performed in a very precise manner.

The method steps are performed for each fraction of the selection of m of the at least m fractions; in other words this means that the method steps are run through for each cascade of m cascades of gravimetric densimetric tables, wherein each cascade comprises at least two gravimetric densimetric tables. One may also say that each cascade comprises at least two stages. As to the understanding of "cascade", reference is made to the statements concerning the first aspect of the invention.

It is expedient if the assigned separating densities of a particular stage comprise the same values for all m cascades. As to the understanding of this embodiment, reference is made to the statements concerning the first aspect of the invention.

Due to the fact that each fraction runs through the sorting by at least two gravimetric densimetric tables it is ensured that the individual components and/or particles can be separated precisely by their densities.

The combination of fractioning and a separation by means of parallel gravimetric densimetric tables arranged in cascades thus enables an (almost) homogeneous separating of the mixture of substances into the respective components. It is also in accordance with the invention if the components comprise product classes from different substances or mixtures of substances which are, especially in accordance with their density, all suited for the further use and/or the recycling for the production of new high-quality concrete, for example.

The method has the further advantage that, due to the use of the gravimetric densimetric tables, the use of water can be renounced during the processing. The residual building materials and/or demolition materials are not moistened unnecessarily. A subsequent drying of the substances which is possibly necessary is avoided.

Each repetition of steps (i) and (ii) adds a further step of gravimetric densimetric tables, that is, of sorting processes to a cascade. Within one cascade a part of or also all of the partial fractions produced is then transported from one stage to the next one.

Each further step of the cascade enables a further, finer limitation of a density range. If, for instance, a gravimetric densimetric table of the i-th stage, 1≤i≤n, is, in the j-th cascade, 1≤j≤m, supplied with a mixture of substances with particles whose density $\rho$ is in the density range $(\rho_{i-1,j}^{(1)}; \rho_{i-1,j}^{(2)})$ (i.e. $\rho_{i-1,j}^{(1)} \leq \rho \leq \rho_{i-1,j}^{(2)}$), it is expedient that this gravimetric densimetric table of the stage i and the cascade j is assigned with a separating density, $\rho_{i,j}^{(0)}$, from the range $(\rho_{i-1,j}^{(1)}; \rho_{i-1,j}^{(2)})$, i.e. $\rho_{i-1,j}^{(1)} \leq \rho_{i,j}^{(0)} \leq \rho_{i-1,j}^{(2)}$. This is because then the gravimetric densimetric table of the i-th stage of the j-th cascade produces a first partial fraction with particles whose density lies in the range $(\rho_{i-1,j}^{(1)}; \rho_{i,j}^{(0)})$ and a second partial fraction with particles whose density lies in the range $(\rho_{i,j}^{(0)}; \rho_{i-1,j}^{(2)})$. The first partial fraction produced this way may also be conceived as a light fraction of the gravimetric densimetric table of the i-th stage of the j-th cascade; the second partial fraction produced this way as the heavy fraction thereof. It has to be taken into account that the separation in density ranges may take place up to a certain technically conditioned quality only, as already described with respect to the first aspect of the invention.

It goes without saying that the limits of the density ranges $(\rho_{i,j}^{(1)}; \rho_{i,j}^{(2)})$ may also be bounded below by zero, i.e. $\rho_{i,j}^{(1)}=0$, and/or be unbounded above, i.e. $\rho_{i,j}^{(2)} \to \infty$. For instance, with the fractions supplied to the gravimetric densimetric tables of the first stage it may possibly be assumed that the contained particles may have any density, so that in this case the density range would range from 0 to infinite.

The more gravimetric densimetric tables are used in one cascade, the narrower the density range becomes, and the fewer substances and/or materials the associated partial fraction will contain. In other words, the method in accordance with the invention enables a separation of particles even if the density differences of the (partial) fraction to be separated are only very small.

The foregoing statements concerning the determination of the predetermined density can be applied correspondingly to the system in accordance with the first aspect of the invention, the facility in accordance with the second aspect of the invention, and the use in accordance with the third aspect of the invention.

Moreover, the method in accordance with the invention enables a high throughput performance and consumes little energy.

It may be of advantage if in at least one or also in each cascade for every k always exactly only one of the partial fractions produced in stage k is transported to and separated by an assigned gravimetric densimetric table of the stage k+1. In this case the gravimetric densimetric table assigned to the next stage of the considered cascade then again separates the partial fraction supplied to it into two partial fractions, wherein only one of the two partial fractions is again transported to a further gravimetric densimetric table within the same cascade.

It is also in accordance with the invention if within one cascade for each stage always only the first partial fraction and/or light fraction of a particular stage is supplied to the gravimetric densimetric table of the subsequent stage. In this case it is sufficient to provide exactly one gravimetric densimetric table per cascade and stage. This means that of the two partial fractions produced by the gravimetric densimetric table of the particular stage of the cascade, always the one partial fraction within the cascade is supplied to the gravimetric densimetric table of the subsequent stage of the cascade which comprises particles with a density smaller than the separating density assigned to the gravimetric densimetric table of the particular stage. In this case, expediently none of the respective second partial fractions and/or heavy fractions has to be supplied to a further gravimetric densimetric table, but may be transported off as a final product for collection in a container, for instance. For this case, advantageously the separating density assigned to the gravimetric densimetric table of the first stage is chosen such that its heavy fraction merely comprises particles of one material, i.e. the substance with the largest density. Then the light fraction comprises a mixture of substances of particles of the remaining materials and/or substances contained in the original fraction. Thus, a final product can already be produced in the first stage which contains (almost exclusively) particles of the heavy material mentioned. The separating density assigned to the gravimetric densimetric table of the second stage is expediently chosen such that, with respect to the partial fraction supplied thereto, again only the heaviest substance is separated as a heavy fraction. Thus, it may be achieved that the second heaviest substance of the materials contained in the original fraction is separated and/or obtained as a final product already in the second stage. This procedure for the selection of separating densities is repeated from stage to stage. Thus, it is possible per stage to separate particles of a particular material as a final material. Expediently, in the last stage the last two remaining substances of the mixture of substances are separated from each other. However, due to the material properties this need not always be possible, so that other separating steps would have to be applied if a further separation is necessary at all.

It is also in accordance with the invention if within one cascade for each stage only always the second partial fraction and/or the heavy fraction of the one stage is supplied to the gravimetric densimetric table of the subsequent stage. In this case it is sufficient to provide exactly one gravimetric densimetric table per cascade and stage. This means that of the two partial fractions produced by the gravimetric densimetric table of the particular stage of the cascade always the one partial fraction is supplied within the cascade to the gravimetric densimetric table of the subsequent step of the cascade which comprises particles with a density larger than the separating density assigned to the gravimetric densimetric table of the particular stage. In this case expediently none of the respective first partial fractions and/or light fractions has to be supplied to a further gravimetric densimetric table, but may be transported off as a final product for collection in a container, for example. For this case the separating density assigned to the gravimetric densimetric table of the first stage is advantageously chosen such that its light fraction merely comprises particles of one material, i.e. the substance with the lowest density. Then, the heavy fraction comprises a mixture of substances of particles of the remaining materials and/or substances contained in the original fraction. Thus, a final product can already be produced in the first stage which comprises (almost exclusively) particles of the light material mentioned. The separating density assigned to the gravimetric densimetric table of the second stage is expediently chosen such that, with respect to the partial fraction assigned to it, again only the lightest substance is separated as a light fraction. Thus it can be achieved that the second lightest substance of the materials contained in the original fraction is separated and/or obtained as a final product in the second stage already. This procedure for the selection of the separating densities is repeated from stage to stage. Thus, per stage particles of a particular material can be separated as a final material. Expediently, in the last stage the last two remaining substances of the mixture of substances are separated from each other. However, due to the material properties this need not always be possible, so that other separating steps would have to be used. The embodiment just described is worth being preferred since particles with lower density are difficult to hold in the gravimetric densimetric table. Light materials such as films, paper, wood chucks, etc. tend to fly away. It is therefore meaningful to separate them in the first stage and/or in one of the first stages already.

The afore-mentioned reflections apply correspondingly for the system in accordance with the first aspect of the invention, especially for the assigned separating densities described there.

It is also advantageous if, for at least one k, at least two of the partial fractions produced in step k are transported to and separated by respectively assigned gravimetric densimetric tables of the stage k+1.

It is particularly preferred if for at least one fraction for each k always all the partial fractions produced in stage k are transported to and separated by assigned gravimetric densimetric tables of the stage k+1.

The afore-mentioned embodiments in accordance with the invention generate the tree structure described already in connection with the first aspect of the invention. For said tree structure, which may be run through in connection with the implementation of the method according to the invention, the statements concerning the first aspect of the invention apply correspondingly and are also used here.

It may be expedient that the partial fraction which is not transported from one assigned gravimetric densimetric table to a further gravimetric densimetric table is transported off by conveyor belts and collected in appropriate containers.

It is expedient if the final products, i.e. the partial fractions produced by gravimetric densimetric tables after the running of the fractions through the cascade structure and/or the tree structure comprising the cascade structure, are collected and/or transported further or transported off.

It is also in accordance with the invention if the transporting of the partial fractions from one gravimetric densimetric table of one stage to the gravimetric densimetric table of the next stage within one cascade is performed manually.

It is, however, expedient if the step of transporting of the partial fractions comprises the use of a conveyor unit comprising one or a plurality of conveying aggregates. Expediently, the conveying aggregates comprise associated conveyor belts.

Due to the use of the conveyor unit with conveying aggregates, the use of manual picking stations may be renounced, and a largely automated system may be provided. The invention enables the breaking of the residual building materials and/or demolition materials inclusive of many components contained to yield the grain ranges described, whereafter these undesired substances can be removed mechanically. This reduces the effort at the building site and/or demolition site for the preparation of the mixtures of substances.

Preferably, the method comprises, prior to the step of dividing the mixture of substances into at least m fractions, the step of:
crushing the particles of the mixture of substances by means of one or a plurality of breaking units.
Expediently, the method further comprises the step of:
after crushing, returning particles having a size which does not correspond to any of the size distributions of the m fractions to the breaking unit.
Furthermore, it is of advantage if the method further comprises the step of:
prior to the crushing of the mixture of substances, separating of metal parts from the mixture of substances, and
subsequently, crushing the mixture of substances freed from the metal parts.

Advantages and further embodiments concerning the last advantageous steps result in correspondence with the explanations concerning the first aspect of the invention.

The afore-mentioned method of the fourth aspect of the invention is used in a particularly preferred manner during the processing and/or during the recycling of residual building materials and/or demolition materials. This means, in this case it is the matter of a method for the processing and/or for the recycling of residual building materials and/or demolition materials, wherein the residual building materials and/or the demolition materials are present as a mixture of substances. The method comprises the same steps as the method described before in accordance with the fourth aspect of the invention. The expedient and advantageous embodiments of the method according to the fourth aspect of the invention are also used correspondingly in the method for the processing and/or for the recycling of residual building materials and/or demolition materials.

Figure 2:
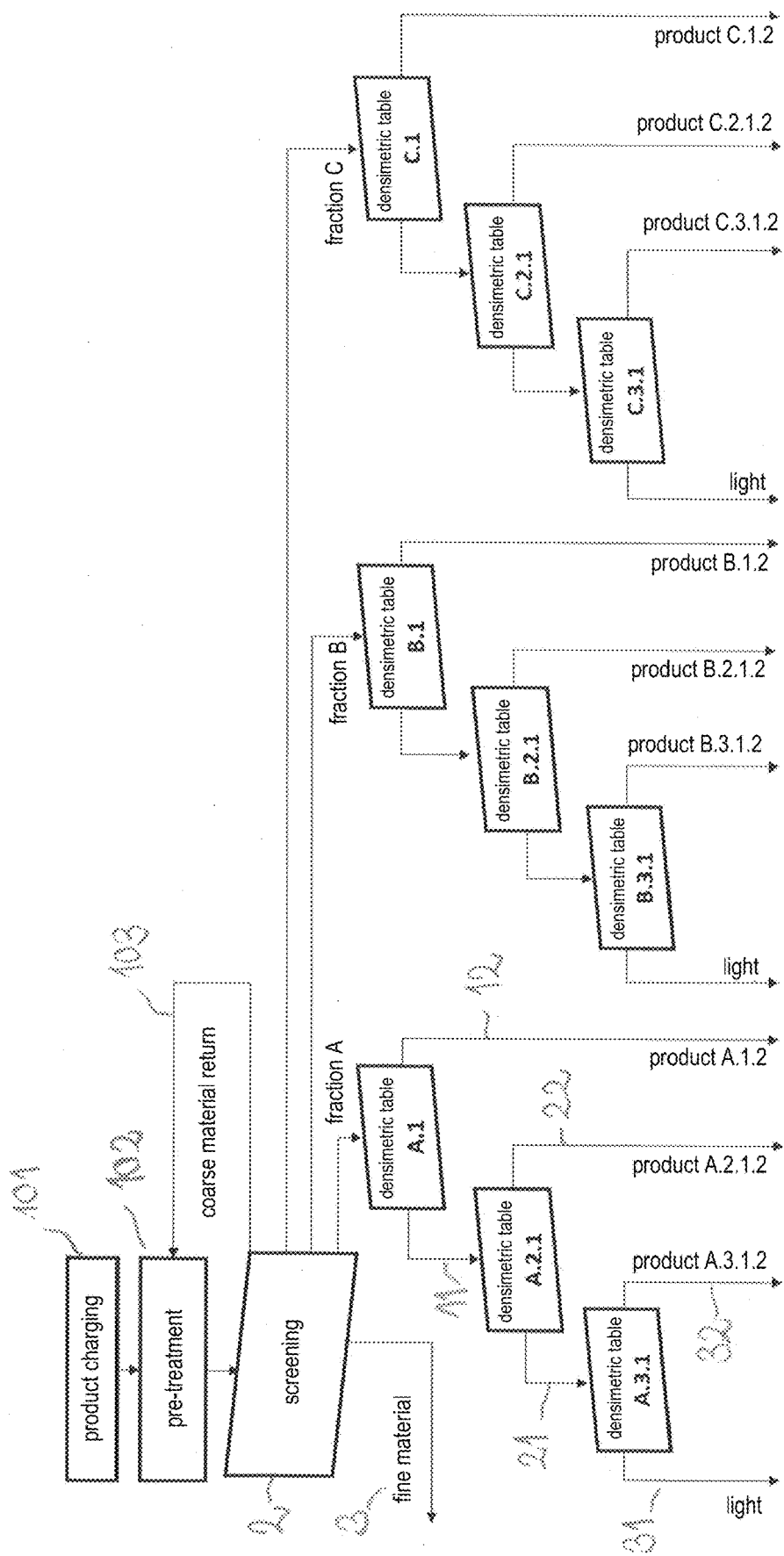
Figure 3:
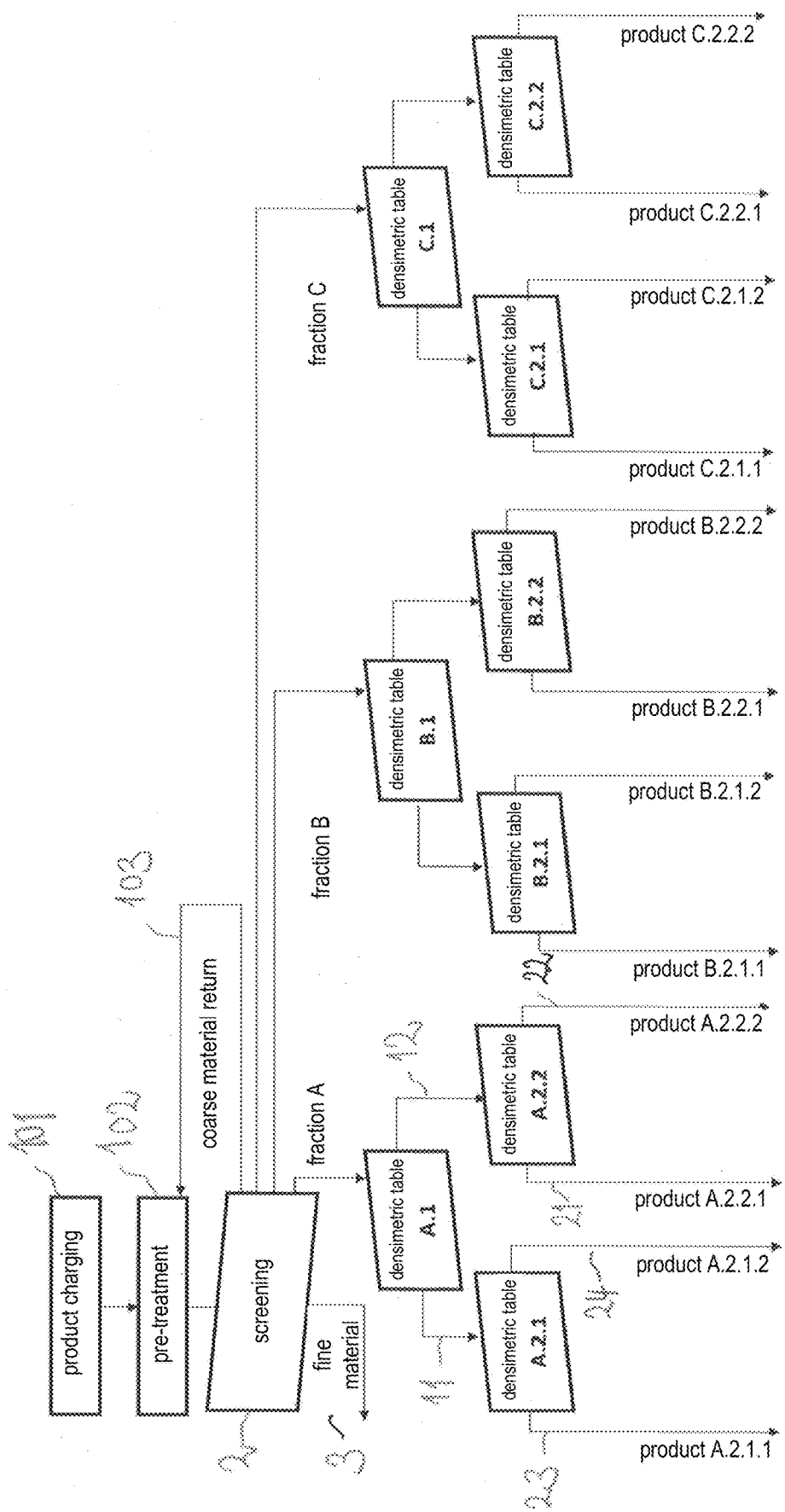
Figure 4:
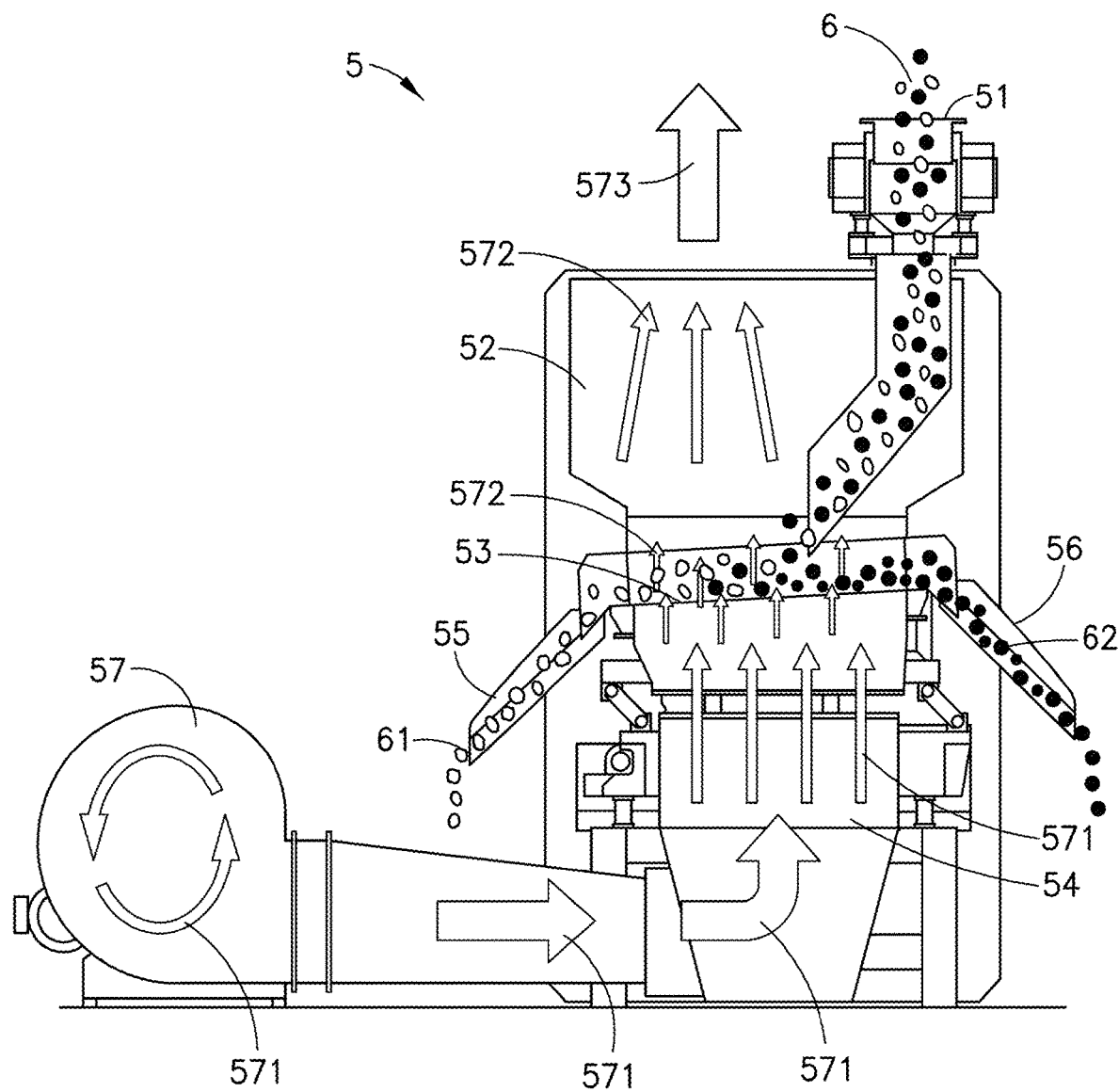
Figure 5:
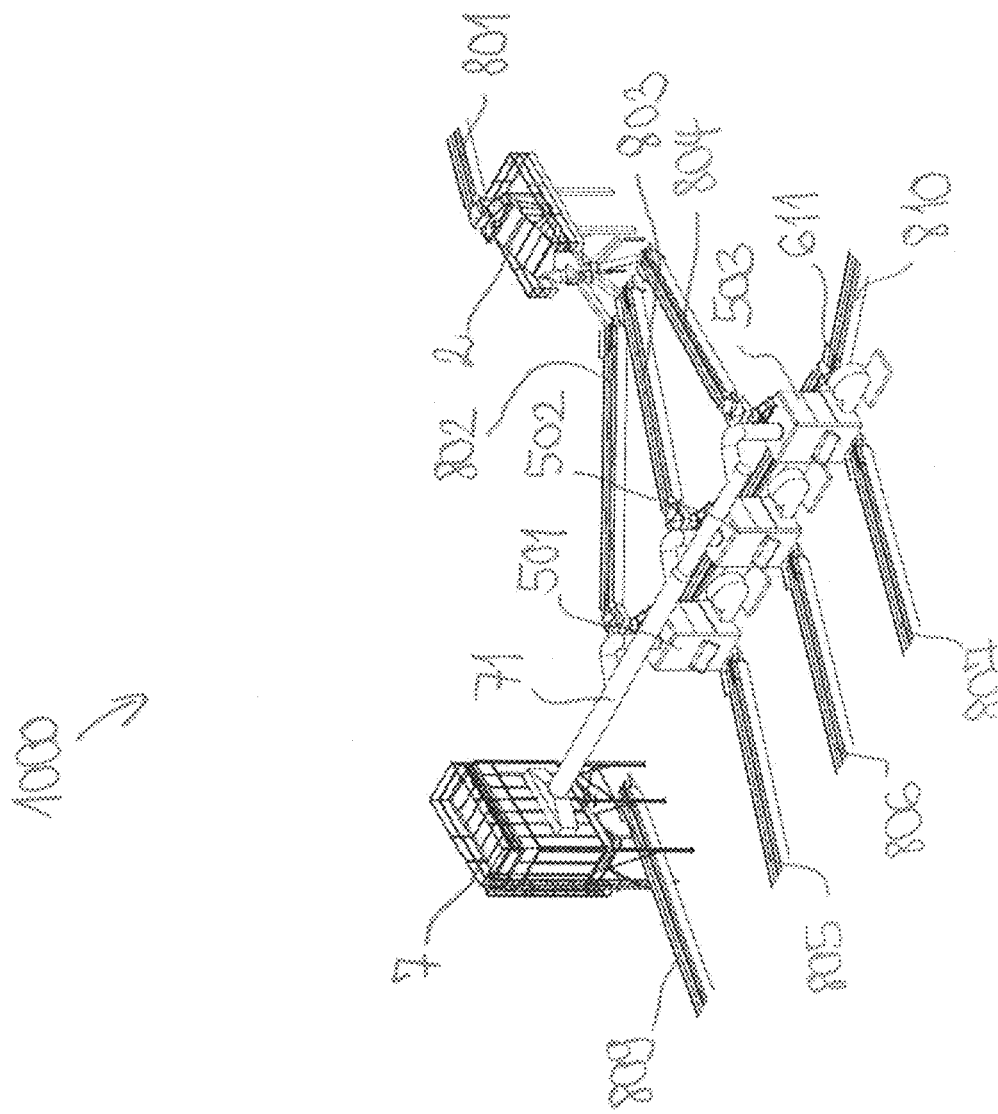

In the following, preferred embodiments of the present invention will be described by means of the following Figures. They show:

FIG. 1: a schematic representation of a system in accordance with the invention for the gravimetric sorting of a mixture of substances by means of gravimetric densimetric tables, wherein the respective heavy fractions are transported further within one cascade from one gravimetric densimetric table to the next one;

FIG. 2: a schematic representation of a further system in accordance with the invention for the gravimetric sorting of a mixture of substances by means of gravimetric densimetric tables, wherein the respective light fractions are transported further within one cascade from one gravimetric densimetric table to the next one;

FIG. 3: a schematic representation of a further system in accordance with the invention for the gravimetric sorting of a mixture of substances by means of gravimetric densimetric tables arranged in a tree structure;

FIG. 4: a gravimetric densimetric table which may be used in a system in accordance with the invention or in a facility in accordance with the invention;

FIG. 5: a section from a facility in accordance with the invention for the processing and/or for the recycling of residual building materials and/or demolition materials.

FIG. 1 is an embodiment of a system in accordance with the invention for the gravimetric sorting of a mixture of substances. This system may preferably be used in a facility for the processing and/or for the recycling of residual building materials and/or demolition material. The residual building materials and/or demolition materials are present in the form of a mixture of substances. The residual building materials or demolition materials are preferably substances such as plastics, wood, plaster, glass, clay, concrete, gravel, stones, broken stones, and/or metal, etc., typically in parts or pieces of the most varying sizes. After charging the residual building materials and/or demolition materials into the product charging 101 and a possible pre-treatment 102, for instance, by magnetic separators for separating magnetic materials such as metals, or by a breaking unit for crushing the particles, which will be described in more detail below, the residual building materials and/or demolition materials are supplied to a fractioning unit 2. The fractioning unit 2 may be one or a plurality of screening machines, preferably sizers. The fractioning unit 2 produces a particular number of fractions. FIG. 1 illustrates that the three fractions A, B, and C are produced by means of the fractioning unit 2. Each of the fractions A, B, and C comprises particles with a predetermined size distribution. Expediently, the particles are sorted by their grain size. Preferably, the grain sizes of the individual particles do not overlap. Moreover, fine material 3 is also produced. Fine material 3 is particles with a grain size below a particular limit diameter; this limit diameter is typically 1 mm. Fine material 3 accruing in the fractioning unit 2 is expediently discharged without further sorting. This fine material 3 is predominantly composed of sands and inorganic and organic dusts, the use of which as a building material may be decided on optionally.

Parts of the residual building materials and/or demolition materials and/or components of the mixture of substances whose (grain) size exceeds a certain maximum size (e.g. 32 mm), so-called coarse material, may be returned via the optional coarse material return 103 from the fractioning unit 2 to the further pre-treatment/crushing. By the combination of pre-treatment 102 and fractioning unit 2 with coarse material return 103 it is ensured that only particles with a (grain) size below the particular maximum size get on to the subsequent further processing and sorting.

Each of the fractions is supplied to a cascade of gravimetric densimetric tables. In the concrete embodiment of FIG. 1 this means that the gravimetric densimetric tables, A.1, A.2.2, and A.3.2 form a first cascade of gravimetric densimetric tables; this first cascade is assigned to the fraction A. Furthermore, the gravimetric densimetric tables B.1, B.2.2, and B.3.2 form a second cascade of gravimetric densimetric tables which is assigned to the fraction B. Finally, the gravimetric densimetric tables C.1, C.2.2, and C.3.2 form a third cascade of gravimetric densimetric tables which is assigned to the fraction C.

The gravimetric densimetric tables A.1, B.1, and C.1 are all gravimetric densimetric tables of the first stage; the gravimetric densimetric tables A.2.2, B.2.2, and C.2.2 are gravimetric densimetric tables of the second stage; the gravimetric densimetric tables A.3.2, B.3.2, and C.3.2 are gravimetric densimetric tables of the third stage. The stage i indicates that the (partial) fraction supplied to the gravimetric densimetric table of stage i was already sorted by i–1 preceding gravimetric densimetric tables within the cascade.

It goes without saying that the number of fractions (three) and the number of gravimetric densimetric tables per fraction (also three) shown in FIG. 1 merely serve the illustration of the invention and are not to be understood in a restricting manner.

The fraction A is sorted by the cascade of gravimetric densimetric tables A.1, A.2.2, and A.3.2. Sorting by means of the gravimetric densimetric tables takes place by the density of the particles. For each gravimetric densimetric table a particular separating density may be predetermined by which the particles are separated, a so-called separating density. This means that a gravimetric densimetric table separates particles with a density below the separating density assigned to it—so-called light fraction—from particles with a density above the assigned separating density—so-called heavy fraction. Basically, the separating density may be chosen arbitrarily, so that also components with a small (relative) density difference from 10% on may be separated from each other. Although, depending on the construction and the function, the light fraction may comprise a certain share of particles which have a density above the separating density, and the heavy fraction may comprise a certain share of particles which have a density below the separating density, these shares are typically smaller than 15% of the mass of the light and/or heavy fractions.

In the arrangement illustrated in FIG. 1 the heavy fraction is, within each cascade, passed on from a gravimetric densimetric table of the one stage to the gravimetric densimetric table of the subsequent stage. This will be described concretely in detail in connection with fraction A. The same applies for the fractions B and C.

The fraction A is first of all transported from the fractioning unit 2 to the gravimetric densimetric table A1. For this purpose, for instance, a conveyor belt may be used. The fraction A comprises a mixture of substances with a predetermined size distribution, approximately from 0 to 3 mm or 1 to 3 mm. The gravimetric densimetric table A.1 sorts the fraction A supplied to it into a light fraction 11 and a heavy fraction 12. The light fraction 11 comprises (predominantly) particles with a density below the separating density set for the gravimetric densimetric table A.1 and with the particular (grain) size distribution. The light fraction may, for instance, be transported off and be collected; sorting of the light fraction 11 by means of an additional gravimetric densimetric table is, however, also possible. If the separating density of the gravimetric densimetric table A.1 is set such that merely particles of the lightest ones of the components to be separated are separated as the light fraction 11, this light fraction is collected as a final product. The heavy fraction 12 is supplied to the gravimetric densimetric table A.2.2 of the second stage. It sorts the heavy fraction 12 into a further light fraction 21 and a heavy fraction 22. A particular separating density is set for the gravimetric densimetric table A.2.2 by means of which the particles of the light fraction 21 are separated from the particles of the heavy fraction 22. Expediently, in the embodiment of FIG. 1 the separating density assigned to the gravimetric densimetric table A.2.2 is predetermined such that it lies between the density of the lightest component of the heavy fraction 12 to be separated and the density of the next heavier component of the heavy fraction 12. The light fraction 21 then comprises (predominantly) particles of the components with the lowest density in the heavy fraction 12. In other words, the light fraction 21 comprises particles of the second lightest component in fraction A. The light fraction 21 may then be collected as the final product A.2.2.1.

The heavy fraction 22 is supplied to the gravimetric densimetric table A.3.2 of the third stage. It sorts the heavy fraction 22 into a further light fraction 31 and a heavy fraction 32. A further particular separating density is set for the gravimetric densimetric table A.3.2 by means of which the particles of the light fraction 31 are separated from the particles of the heavy fraction 32. Expediently, in the embodiment of FIG. 1 the separating density assigned to the gravimetric densimetric table A.3.2 is predetermined such that it lies between the density of the lightest component of the heavy fraction 22 and the density of the next heavier component of the heavy fraction 22. The light fraction 31 then comprises (predominantly) particles of the component with the lowest density in the heavy fraction 22. In other words, the light fraction 31 comprises particles of the third lightest component in fraction A. The light fraction 21 may then be collected as the final product A.3.2.1.

In FIG. 1 it is assumed that the fraction A comprises four components to be separated. The heavy fraction 32 is thus—after the light fractions 11, 21, 31—the last of these components. It may be collected and transported off as the final product A.3.2.2.

The partial fractions 21 (light fraction of the gravimetric densimetric table A.2.2), 31 (light fraction of the gravimetric densimetric table A.3.2), and 32 (heavy fraction of the gravimetric densimetric table A.3.2) may be transported off, be collected and/or be further processed as (final) products A.2.2.1, A.3.2.1 and/or A.3.2.2.

The sorting of the fractions B by means of the densimetric tables B.1, B.2.2, and B.3.2 into (final) products B.2.2.1, B.3.2.1, and B.3.2.2 and C by means of the densimetric tables C.1, C.2.2, and C.3.2 into (final) products C.2.2.1, C.3.2.1, and C.3.2.2 is performed in analogy to the sorting of the fraction A. The predetermined densities of the gravimetric densimetric tables in a particular stage may be identical for all fractions and/or cascades, but this is not mandatorily necessary in accordance with the invention. The fraction B may, for instance, comprise particles with a grain size distribution of between 3 mm and 9 mm, the fraction C, for instance, particles with a grain size distribution of between 9 mm and 25 mm.

The system in accordance with the invention illustrated in FIG. 2 differs from the one illustrated in FIG. 1 in that within each cascade instead of the heavy fraction per stage the respective light fraction is transported from one gravimetric densimetric table to the next one.

For the description of the product charging 101, the pre-treatment 102, the fractioning unit 2, the coarse material return 103, and the fine material 3, reference may therefore be made to the statements concerning FIG. 1.

As already in connection with FIG. 1, also with respect to FIG. 2 only the sorting of the fraction A will be described in detail. The sorting of the fractions B and C takes place in analogy.

First of all, the fraction A is transported from the fractioning unit 2 to the gravimetric densimetric table A.1. The gravimetric densimetric table A.1 sorts the fraction A supplied to it into a light fraction 11 and a heavy fraction 12, as already described above in connection with FIG. 1. The heavy fraction 12 comprises (predominantly) particles with a density larger than the separating density set for the gravimetric densimetric table A.1. It is expedient to choose the separating density of the gravimetric densimetric table A.1 such that it lies between the density of the particles of the heaviest and second heaviest components contained in the fraction A. In accordance with the embodiment of FIG. 2 the heavy fraction 12 is transported off and/or collected as the (final) product A.1.2. If the separating density is chosen as described to be expedient, the heavy fraction 12 comprises predominantly only particles of the component with the largest density. The light fraction 11 is supplied to the gravimetric densimetric table A.2.1 of the second stage. It sorts the light fraction 11 into a further light fraction 21 and a heavy fraction 22. For the gravimetric densimetric table A.2.1 a particular separating density is set by means of which the particles of the light fraction 21 are separated from the particles of the heavy fraction 22. Expediently, in the embodiment of FIG. 2 the separating density of the gravimetric densimetric table A.2.1 is predetermined such that it lies between the density of the particles of the heaviest and second heaviest components contained in the light fraction 11. The heavy fraction 22 then comprises (predominantly) particles of the component of the heaviest density in the light fraction 11. In other words, the heavy fraction 22 comprises particles of the second heaviest component in the fraction A. The heavy fraction 22 may then be collected as the final product A.2.1.2.

The light fraction 21 is supplied to the gravimetric densimetric table A.3.1 of the third stage. It sorts the light fraction 21 into a further light fraction 31 and a heavy fraction 32. For the gravimetric densimetric table A.3.1 a further particular separating density is set by means of which the particles of the light fraction 31 are separated from the particles of the heavy fraction 32. Expediently, in the embodiment of FIG. 2 this particular separating density of the gravimetric densimetric table A.3.1 is predetermined such that it lies between the density of the particles of the heaviest and second heaviest components in the light fraction 21. The heavy fraction 32 then comprises (predominantly) particles of the component with the third largest density in the fraction A. The heavy fraction 32 may then be transported off and/or collected as the final product A.3.1.2. Assuming that the fraction comprises four components to be separated, the light fraction 31 then corresponds to the last and lightest component. It may be transported off and/or collected as the (final) product A.3.1.2.

The light fraction 31 shown may either also be transported off and/or collected as a (final) product. It is, however, also possible that it is further processed otherwise, for instance, by being subject to an additional sorting process by means of an appropriate gravimetric densimetric table.

The sorting of the fractions B by means of the densimetric tables B.1, B.2.1, and B.3.1 into (final) products B.1.2, B.2.1.2, and/or B.3.1.2 and C by means of the densimetric tables C.1, C.2.1, and C.3.1 into (final) products C.1.2, C.2.1.2, and/or C.3.1.2 takes place in analogy to the sorting of the fraction A. The predetermined densities of the gravimetric densimetric tables in a particular stage may be identical for all fractions and/or cascades, but this is not mandatorily necessary in accordance with the invention.

The system in accordance with the invention illustrated in FIG. 3 differs from the one illustrated in FIGS. 1 and 2 in that within each cascade both the light and the heavy fractions are further transported from the gravimetric densimetric tables of one stage to the gravimetric densimetric tables of the next stage. Thus, a tree structure is formed per cascade.

For the description of the product charging 101, the pre-treatment 102, the fractioning unit 2, the coarse material return 103, and the fine material 3, reference may again be made to the statements concerning FIG. 1.

As already in connection with FIGS. 1 and 2, also with respect to FIG. 3 only the sorting of the fraction A will be described in detail. The sorting of the fractions B and C takes place in analogy.

First of all, the fraction A is transported from the fractioning unit 2 to the gravimetric densimetric table A.1. The gravimetric densimetric table A.1 sorts the fraction A supplied to it into a light fraction 11 and a heavy fraction 12, as already described above in connection with FIG. 1. The heavy fraction 12 comprises (predominantly) particles with a density larger than the separating density set for the gravimetric densimetric table A.1. Assuming that the fraction A comprises a number P (here: P=4) components to be separated, it is in this case expedient to choose the separating density of the gravimetric densimetric table A.1 such that it lies between the density of the lightest P/2 (here: 2) and the heaviest P/2 components to be separated and contained in the fraction A; then, the light fraction 11 comprises predominantly a mixture of substances of particles of the P/2 lightest components, the heavy fraction 12 predominantly a mixture of substances of particles of the P/2 heaviest components.

In accordance with the embodiment of FIG. 3 the light fraction 11 is supplied to the gravimetric densimetric table A.2.1, the heavy fraction 12 to the gravimetric densimetric table A.2.2. The gravimetric densimetric table A.2.1 sorts the light fraction 11 into a further light fraction 23 and a heavy fraction 24. For the gravimetric densimetric table A.2.1 a particular separating density is set by means of which the particles of the light fraction 23 are separated from the particles of the heavy fraction 24. Expediently, in the embodiment of FIG. 3 the separating density of the gravimetric densimetric table A.2.1 is predetermined such that it lies between the density of the lightest P/4 (here: 1) and P/4 next heavier components to be separated. The light fraction 23 then comprises (predominantly) particles of the component with the smallest density; the heavy fraction 24 then comprises (predominantly) particles of the component with the next larger density. The gravimetric densimetric table A.2.2 sorts the heavy fraction 12 into a light fraction 21 and a heavy fraction 22. For the gravimetric densimetric table A.2.2 a particular separating density is set by means of which the particles of the light fraction 21 are separated from the particles of the heavy fraction 22. Expediently, in the embodiment of FIG. 3 the separating density of the gravimetric densimetric table A.2.2 is predetermined such that it lies between the density of the second heaviest P/4 (here: 1) and P/4 heaviest components to be separated. The light fraction 21 then comprises (predominantly) particles of the component with the second largest density; the heavy fraction then comprises (predominantly) particles of the component with the largest density.

The light and heavy fractions 21, 22, 23, 24 may then be transported off and/or collected as final products A.2.2.1, A.2.2.2, A.2.1.1, and/or A.2.1.2

The sorting of the fractions B by means of the densimetric tables B.1, B.2.1, and B.2.2 into (final) products B.2.1.1, B.2.1.2, B.2.2.1, B.2.2.2 and C by means of the densimetric tables C.1, C.2.1, and C.2.2 into (final) products C.2.1.1, C.2.1.2, C.2.2.1, C.2.2.2 takes place in analogy to the sorting of the fraction A. The predetermined densities of the gravimetric densimetric tables in a predetermined stage may be identical for all fractions and/or cascades, but this is not mandatorily necessary in accordance with the invention.

If one compares the structure of the cascades in FIGS. 1 and 2, on the one hand, with the tree structure in FIG. 3, one finds first of all that, in all three Figures, three gravimetric densimetric tables are used per cascade and four final products can be produced in each case. In FIGS. 1 and 2 however, three stages are necessary for this purpose, in FIG. 3 only two stages. The processing time is shorter in the tree structure of FIG. 3 as compared to that of the structures of FIGS. 1 and 2. This was explained in general further above already.

With respect to FIGS. 1, 2, and 3 it is further noted that the components mentioned need not only comprise one single substance or one single material, they may rather also comprise mixtures or compositions of a plurality of substances or materials.

In the following, embodiments of the product charging 101, the pre-treatment 102, the fractioning unit 2, and the coarse material return 103, which are each illustrated in FIGS. 1, 2, and 3, will be described.

The product charging 101 may, for instance, be performed in that the mixture of substances, such as residual building materials or demolition materials to be treated, are charged to the system or the facility by means of a conveyor, e.g. a suitable front-end loader.

The pre-treatment 102 may comprise a first processing step in which, by means of a coarse sizing, coarse and/or very unshaped extraneous material with a (grain) size above a particular separating size, e.g. larger than 80 mm, are separated. Thus, substances and materials such as e.g. textiles, plaster boards, wood, tubes, armoring iron, may be separated. So-called rod sizers are suited for this separation.

The accruing charging substances with a (grain) size below a particular separation size may already comprise a high share of sortable particles. Therefore, the pre-treatment 102 may comprise a separator for separating metal parts so as to separate from the mixture of substances with substances/materials below a particular separation size ferromagnetic metals still contained therein after being supplied by a conveyor organ such as e.g. a vibration conveyor. This is preferably a magnetic separator, e.g. a so-called suspension magnetic separator arranged above the subsequent conveyor belt. Optionally, a separator for non-magnetic metals may be added.

The pre-treatment may further comprise a breaking unit which preferably comprises a jaw crusher. This breaking unit may be supplied with the mixture of substances freed from metal parts. The breaking unit is capable of further crushing the mixtures of substances. Specifically, in addition to crushing it is achieved that compound materials which are usually present in residual building materials are not only crushed, but divided at their junctions of the different substances. Such compound materials are, for instance, bricks containing mortar and plaster residues, insulating material adhering to mineral substances, both of organic nature (foam materials, mineral wool) and of inorganic nature (pumice, expanded clay, perlite, zeolite), etc.

The crushing of the particles and the separation of the substances from each other facilitates the sorting of the materials in the further course of the process since the previously existing mixing density of the particles from tow or more substances is changed toward the respective pure substances. In addition, plaster and mortar residues, for instance, preferably disintegrate to small particles by the breaking process and are subsequently present in the form of sands and mineral dust. Sands and dusts can be separated in the further course of the process by means of sizers in a relatively simple manner from coarser materials in the form of which hard and heavy minerals such as gravel, broken stones, ceramics, etc. preferably accrue.

The pre-treatment 102 is followed by the fractioning unit 2. It comprises preferably a screening machine, preferably a so-called sizer with screening cloths arranged obliquely to the horizontal. The latter have stood the test in building materials industry, are largely insensitive to pollutions and congestions, and are capable of preferably screening coarse materials with high solid matter throughput. Other screening machines may, however, also be used. As explained in detail above, the fractioning unit 2 produces fractions with a grain size distribution which is optimally narrow for the subsequent sorting.

Since residue of compounds may be present especially in the coarsest granularity not disintegrated in the breaking unit, the coarse material, i.e. particles with a (grain) size above a particular minimal size, for instance larger than 50 mm, is returned from the fractioning unit 2 to the breaking unit of the pre-treatment 102. This is achieved by means of the coarse material return 103. The combination of breaking unit and fractioning unit 2 with the coarse material return 103 ensures that only particles with a (grain) size below a particular minimal size, for instance, smaller than 50 mm, get on to the subsequent further processing and sorting. Depending on the nature of the concrete residual building materials and demolition materials in the mixture of substances the separating cut for the return to the breaking unit may also lie with another grain size, for instance, with a particular minimal size of 40 mm or 30 mm. The screening cloth of the upper deck of the fractioning unit 2 will have to be chosen accordingly. If the separation and the return takes place with less than 50 mm, the grading of the other screening cloths positioned below the upper deck will as a rule also be changed. Moreover, due to the breaking of the entire mixture of substances after the pre-treatment to relatively small particles sizes, e.g. below 50 mm or preferably below 32 or even below 16 mm, the use of automated methods by means of gravimetric densimetric tables is facilitated while usually the crushing of mixtures of substances without previous sorting has rather been avoided. In general, it has been assumed that it would be easier to sort out extraneous matter prior to the crushing of the entire material. However, a lot of manual effort has usually been required for this. The sorting of coarse materials by means of gravimetric densimetric tables is, however, difficult and works better if the material has been crushed well. Thus, the effort of a pre-treatment of the mixtures of substances at the building site or at the place of the facilities may be reduced and costs may be saved.

By means of the pre-treatment 102, the fractioning unit 2, and the coarse material return 103 it is in a particularly preferred manner possible to obtain fractions in the following ranges: 1-3 mm; 3-9 mm, and 9-25 mm or 2-4 mm; 4-8 mm, 8-16 mm. These fractions are especially decisive for the use as raw material and/or as additive for the production of highest-quality concrete. In order to achieve the optimum crushing to less than 25 mm and/or less than 16 mm for the subsequent sorting, the fraction of 25-50 mm is supplied to a further crushing stage by means of an impact crusher which may be part of the pre-treatment 102, and subsequently via a further sizer which may be part of the fractioning unit 2, and a return 103 of the coarse material larger than 25 mm and/or 16 mm. Fine material separated in the sizer and having a (grain) size of less than 1 mm and/or 2 mm is, along with the fine material accruing in the sizer and having a size of less than 1 mm and/or 2 mm, discharged without further sorting. This fine material is predominantly composed of sands and inorganic dusts, the use of which as a building material may be decided on optionally.

FIG. 4 illustrates a gravimetric densimetric table 5 which may be used in a system in accordance with the invention or in a facility for the processing and/or for the recycling of residual building materials and/or demolition materials in accordance with the invention. The mixture of substances is introduced into a supply 51 of the densimetric table 5 as the charging material 6.

The gravimetric densimetric table 5 illustrated comprises an obliquely arranged work floor 53 which is flown through with air 571, 572 from below. The air 571, 572 flowing through the work floor 53 is generated by an air supply ventilator 57. The air 571 is introduced by the air supply ventilator 57 into the bottom part 54 of the gravimetric densimetric table 5, then flows through the work floor 53, flows on to the top part 52 of the gravimetric densimetric table 5, and then leaves it as exhaust air 573.

The work floor 53 is inclined at an angle to the vertical and may vibrate in the direction of the ascent of the work floor 53. Thus, the heavy particles 62 which are present in the charging material 6 and which preferably sink onto the work floor 53 despite the vertical air flow 571, 572 are conveyed upward to the upper end of the work floor 53 and discharged from the gravimetric densimetric table via the exit 56 for the heavy fraction 62. The light particles 61 are fluidized and slightly lifted by the perpendicular upward flow of the air 571, 572, so that they have no or just little contact to the work floor 53 and consequently flow to the lower end of the work floor 53 due to the fluidization. There, they may exit from the gravimetric densimetric table 5 via the exit 55 for the light fraction 61.

By the gravimetric densimetric table a fraction cannot only be separated into a light and a heavy fraction, these fractions are moreover dedusted and/or freed from very light materials which are discharged from the densimetric table with the exhaust air 573 to the top and segregated in a downstream waste air filter (see in this respect also FIG. 5).

By adjusting the strength of the air flow 571, 572, the angle of inclination of the work floor 53, the vibration frequency, and/or the vibration amplitude it is possible to predetermine a particular separating density differentiating the light fraction 61 from the heavy fraction 62.

By the dividing of the mixture of substances in accordance with the invention into diverse fractions a gravimetric densimetric table 5 is supplied with a charging material 6 with an optimally narrow grain size distribution. This can avoid that small, heavy particles (i.e. particles with large density) which may have a similar fluidization or sinking behavior in air as larger, light particles (i.e. particles with small density) are sorted incorrectly by density. If one narrows the grain size distribution of the charging material 6, this can achieve that the particles are not sorted by their heaviness of the individual particles, but actually by the density of the substances forming the particles.

FIG. 5 shows, for the purpose of better clarity, a section of a facility 1000 in accordance with the invention for the processing and/or for the recycling of residual building materials and/or demolition materials. The residual building materials and/or demolition materials available as a mixture of substances are, via a conveyor unit 801, such as the conveyor band 801 illustrated, transported into the fractioning unit 2. A sizer with screening cloths arranged obliquely to the horizontal is illustrated here.

The product charging, the pre-treatment as well as a coarse material return as described above in connection with FIGS. 1, 2, and 3 could be arranged upstream of the fractioning unit 2, but are not illustrated separately in FIG. 5 for reasons of clarity.

In the embodiment shown the mixture of substances is divided by means of the fractioning unit 2 into three partial fractions with different grain size distributions. The first partial fraction may, for example, comprise grain sizes of between 1 and 3 mm, the second partial fraction grain sizes of between 3 and 9 mm, and the third partial fraction grain sizes of between 9 and 25 mm. They are transported to assigned gravimetric densimetric tables 501, 502, and/or 503 via conveyor units/conveyor belts 802, 803, and 804.

The facility thus comprises three cascades of gravimetric densimetric tables. In FIG. 5 only one stage of gravimetric densimetric tables is shown explicitly, formed of the gravimetric densimetric tables 501, 502, 503. This is, however, merely due to the clarity of illustration. The complete facility in accordance with the invention comprises more than one gravimetric densimetric table in each cascade, as explained above, and moreover the different, possible stages of pre-treatment.

Each of the gravimetric densimetric tables 501, 502, 503 may be a gravimetric densimetric table like the one described in connection with FIG. 4.

In the example shown the light fractions 611 of the three gravimetric densimetric tables 501, 502, 503 of the first stage are transported off via a conveyor unit/a conveyor belt 810 and may, for instance, be collected at a collection point (not illustrated) for transport and/or further processing. The light fractions 611 thus comprise here particles whose grain size lies in the grain size range which is covered by all three fractions (for the afore-mentioned numerical example this means: the particles have a grain size of between 1 and 25 mm), but whose density lies below a particular separating density.

As explained above, the sorting of the fractions with different grain size distributions achieves that a precise separation of the particles by density can be performed. The heavy fractions of the gravimetric densimetric tables 501, 502, 503 are, via respective conveyor units/conveyor belts 805, 806, and/or 807, conveyed to and sorted by corresponding gravimetric densimetric tables of the second stage (no longer shown). For the processing in the further stages reference may especially be made to the statements concerning FIGS. 1, 2, and 3 and to the introductory part.

Finally, it is shown that each of the three gravimetric densimetric tables 501, 502, 503 is connected with an exhaust air filter 7 via a tubing 71. The exhaust air filter 7 serves to suck the exhaust air from the gravimetric densimetric tables 501, 502, 503 (see in this respect also the description of FIG. 4). The exhaust air may also contain light particles, such as for instance dust and light wood particles.

These are segregated from the waste air filter 7 and transported to a collection point via a conveyor unit/a conveyor belt 809.

Expediently, a separate exhaust air filter is assigned to every stage of gravimetric densimetric tables.

LIST OF REFERENCE NUMBERS

101 product charging
102 pre-treatment
103 coarse material return
2 fractioning unit
3 fine material
A, B, C fractions
A.1, A.2.1, A.2.2, A.3.1, A.3.2 gravimetric densimetric tables of the first cascade
B.1, B.2.1, B.2.2, B.3.1, B.3.2 gravimetric densimetric tables of the second cascade
C.1, C.2.1, C.2.2, C.3.1, C.3.2 gravimetric densimetric tables of the third cascade
11 light fraction of the gravimetric densimetric table A.1
12 heavy fraction of the gravimetric densimetric table A.1
21 light fractions of the gravimetric densimetric tables A.2.1, A.2.2
22 heavy fractions of the gravimetric densimetric tables A.2.1, A.2.2
23 light fraction of the gravimetric densimetric table A.2.1
24 heavy fraction of the gravimetric densimetric table A.2.1
31 light fractions of the gravimetric densimetric tables A.3.1, A.3.2
32 heavy fractions of the gravimetric densimetric tables A.3.1, A.3.2
A.1.2, A.2.1.1, A.2.1.2, A.2.2.1, A.2.2.2, A.3.1.2, A.3.2.1, A.3.2.2 final products from fraction A
B.1.2, B.2.1.1, B.2.1.2, B.2.2.1, B.2.2.2, B.3.1.2, B.3.2.1, B.3.2.2 final products from fraction B
C.1.2, C.2.1.1, C.2.1.2, C.2.2.1, C.2.2.2, C.3.1.2, C.3.2.1, C.3.2.2 final products from fraction C
5, 501, 502, 502 gravimetric densimetric tables
51 supply of the gravimetric densimetric table 5
52 top part of the gravimetric densimetric table 5
53 work floor or the gravimetric densimetric table 5
54 bottom part of the gravimetric densimetric table 5
55 exit for light fraction
56 exit for heavy fraction
57 air supply ventilator
571, 572 air flow
6 charging material
61 light particles of the charging material 6/light fraction
62 heavy particles of the charging material 6/heavy fraction
1000 facility for the processing and/or for the recycling of residual building materials and/or demolition materials
611 light fraction of the facility 1000
7 exhaust air filter
71 tubing to the exhaust air filter 7
801-810 conveyor units/conveyor belts

The invention claimed is:

1. A system for the gravimetric sorting of a mixture of substances during the processing and/or the recycling of residual building materials and/or demolition materials, comprising:
a fractioning unit adapted to divide the mixture of substances into at least m, m≥2, fractions, wherein each fraction comprises particles of a predetermined size distribution;
at least n·m gravimetric densimetric tables arranged in m cascades each with at least n, n≥2, gravimetric densimetric tables distributed to n stages such that each stage comprises per cascade at least one gravimetric densimetric table,
wherein the fractioning unit is coupled to the m gravimetric densimetric tables of the first stage such that a different one of the at least m fractions can be supplied to each of the gravimetric densimetric tables of the first stage;
wherein each gravimetric densimetric table comprises a work floor inclined at an angle to the vertical of the gravimetric densimetric table and adapted to be flown through with air and vibrate to separate particles supplied to the gravimetric densimetric table into an assigned first partial fraction of particles having a density which is smaller than a separating density assigned thereto which flow, with respect to the vertical, to a lower end of the work floor, and into an assigned second partial fraction of particles having a density which is larger than the separating density assigned thereto which flow, with respect to the vertical, to an upper end of the work floor;
wherein, within each cascade, each gravimetric densimetric table of a considered stage is coupled to a gravimetric densimetric table of the preceding stage such that either the first partial fraction or the second partial fraction of the gravimetric densimetric table of the preceding stage can be supplied to the gravimetric densimetric table of the considered stage, and the assigned separating density of the gravimetric densimetric table of the considered stage is chosen to be smaller than the assigned separating density of the gravimetric densimetric table of the preceding stage when the first partial fraction is supplied, the assigned separating density of the gravimetric densimetric table of the considered stage is chosen to be larger than the assigned separating density of the gravimetric densimetric table of the preceding stage when the second partial fraction is supplied;
wherein n+1 final products are separated within each cascade.

2. The system according to claim 1, wherein per cascade each stage comprises exactly one gravimetric densimetric table which can be supplied with a partial fraction of the preceding stage.

3. The system according to claim 1, comprising at least one cascade which comprises at least one stage k, 1<k<n, with at least one additional, second, gravimetric densimetric table, wherein the second gravimetric densimetric table can be supplied with a partial fraction of the preceding stage k−1, and, if the stage k comprises more than one additional gravimetric densimetric table, each of these further gravimetric densimetric tables can be supplied with a corresponding partial fraction of the preceding stage k−1.

4. The system according to claim 1, wherein at least one cascade in the stage k comprises a number of $2^{k-1}$ gravimetric densimetric tables, namely for each k=1 to k=n.

5. The system according to claim 1, further comprising one or a plurality of breaking units designed for crushing the particles of the mixture of substances, wherein the one or the plurality of breaking units is/are coupled to the fractioning unit such that the crushed mixture of substances can be supplied to the fractioning unit.

6. The system according to claim 5, wherein the one or the plurality of breaking units is/are further coupled to the fractioning unit such that particles of the mixture of substances which exceed a particular predetermined size can be returned from the fractioning unit to the one or the plurality of breaking units.

7. The system according to claim 5, further comprising a separator for separating metal parts from the mixture of substances, wherein the separator is coupled to the breaking unit and/or the breaking units such that the mixture of substances freed from the metal parts can be supplied from the separator to the breaking unit and/or the breaking units.

8. The system according to claim 1, wherein the assigned separating densities of a particular stage comprise the same values for all m cascades.

9. A facility for the processing and/or the recycling of residual building materials and/or demolition materials, comprising the system according to claim 1, wherein the residual building material and/or the demolition materials are present as a mixture of substances.

10. A use of the facility according to claim 9 for the processing and/or for the recycling of residual building materials and/or demolition materials, which are present as a mixture of substances, comprising gravimetric sorting of the mixture of substances during the processing and/or the recycling of residual building materials and/or demolition materials.

11. A use of the system of claim 1 for the processing and/or for the recycling of residual building materials and/or demolition materials, which are present as a mixture of substances, comprising gravimetric sorting of the mixture of substances during the processing and/or the recycling of residual building materials and/or demolition materials.

12. A method for the gravimetric sorting of a mixture of substances during the processing and/or the recycling of residual building materials and/or demolition materials, wherein the residual building materials and/or the demolition materials are present as a mixture of substances, comprising the steps of:
dividing the mixture of substances into at least m, m≥2, fractions, wherein each fraction comprises particles of a predetermined size distribution;
for each fraction of a selection of m of the at least m fractions:
separating the particles of the fraction by means of a gravimetric densimetric table of a first stage into a first partial fraction of the first stage with particles having a density below a separating density assigned to the gravimetric densimetric table, and into a second partial fraction of the first stage with particles having a density above the assigned separating density;
for k=1 to k=n−1, n≥2, repeating the following steps to generate partial fractions of the stage n:
(i) transporting a part of or all of the partial fractions generated in stage k to gravimetric densimetric tables of the stage k+1, wherein a transported partial fraction is assigned to each gravimetric densimetric table of the stage k+1 and a separating density is assigned to each gravimetric densimetric table,
(ii) separating each partial fraction transported to the gravimetric densimetric tables of the stage k+1 by means of the gravimetric densimetric table assigned thereto into two further partial fractions, wherein the first partial fraction comprises particles with a density below the separating density assigned to the gravimetric densimetric table, and the second partial fraction comprises particles with a density above the assigned separating density;
wherein each gravimetric densimetric table comprises a work floor inclined at an angle to the vertical of the gravimetric densimetric table and adapted to be flown through with air and vibrate to separate the first partial fraction of particles, which flow, with respect to the vertical, to a lower end of the work floor, from the second partial fraction of particles, which flow, with respect to the vertical, to an upper end of the work floor;
wherein the particles of each fraction are separated into n+1 final products.

13. The method according to claim 12, wherein for each k only exactly one of the partial fractions generated in stage k is transported to and separated by an assigned gravimetric densimetric table of the stage k+1.

14. The method according to claim 12, wherein for at least one k at least two of the partial fractions generated in stage k are transported to and separated by respectively assigned gravimetric densimetric tables of the stage k+1.

15. The method according to claim 12, wherein for at least one fraction for each k always all the partial fractions generated in stage k are transported to and separated by assigned gravimetric densimetric tables of the stage k+1.

16. The method according to claim 12, comprising, prior to the step of dividing the mixture of substances into at least m fractions, the step of:
crushing the particles of the mixture of substances by means of one or a plurality of breaking units;
after crushing, returning particles having a size which does not correspond to any of the size distributions of the m fractions to the one or the plurality of breaking units.

17. The method according to claim 16, further comprising:
prior to the crushing of the mixture of substances, separating of metal parts from the mixture of substances, and
subsequently, crushing the mixture of substances freed from the metal parts.

* * * * *